(12) United States Patent
Malofsky et al.

(10) Patent No.: US 10,913,875 B2
(45) Date of Patent: Feb. 9, 2021

(54) COMPOSITE AND LAMINATE ARTICLES AND POLYMERIZABLE SYSTEMS FOR PRODUCING THE SAME

(71) Applicant: Sirrus, Inc., Loveland, OH (US)

(72) Inventors: Bernard M. Malofsky, Bloomfield, CT (US); Adam G. Malofsky, Loveland, OH (US); Matthew M. Ellison, Mason, OH (US)

(73) Assignee: Sirrus, Inc., Loveland, OH (US)

( * ) Notice: Subject to any disclaimer, the term of this patent is extended or adjusted under 35 U.S.C. 154(b) by 466 days.

(21) Appl. No.: 14/388,601

(22) PCT Filed: Mar. 29, 2013

(86) PCT No.: PCT/US2013/034641
§ 371 (c)(1),
(2) Date: Sep. 26, 2014

(87) PCT Pub. No.: WO2013/149168
PCT Pub. Date: Oct. 3, 2013

(65) Prior Publication Data
US 2015/0056879 A1 Feb. 26, 2015

Related U.S. Application Data

(60) Provisional application No. 61/618,154, filed on Mar. 30, 2012.

(51) Int. Cl.
| | | |
|---|---|---|
| C09J 4/00 | (2006.01) |
| B32B 27/28 | (2006.01) |
| B32B 29/00 | (2006.01) |
| B32B 15/18 | (2006.01) |
| B32B 7/12 | (2006.01) |
| B32B 15/20 | (2006.01) |
| B32B 5/24 | (2006.01) |
| B32B 15/04 | (2006.01) |
| B32B 27/36 | (2006.01) |
| B32B 27/32 | (2006.01) |
| B32B 21/04 | (2006.01) |
| C09J 5/00 | (2006.01) |
| C08F 122/14 | (2006.01) |
| C08F 20/36 | (2006.01) |
| C08J 3/24 | (2006.01) |
| C08F 222/14 | (2006.01) |
| C08F 20/28 | (2006.01) |
| C08J 5/24 | (2006.01) |
| C08K 3/22 | (2006.01) |
| C08K 3/36 | (2006.01) |
| C08K 7/06 | (2006.01) |
| C08K 7/14 | (2006.01) |
| C09J 11/04 | (2006.01) |

(Continued)

(52) U.S. Cl.
CPC .................. *C09J 4/00* (2013.01); *B32B 5/24* (2013.01); *B32B 7/12* (2013.01); *B32B 15/04* (2013.01); *B32B 15/18* (2013.01); *B32B 15/20* (2013.01); *B32B 21/04* (2013.01); *B32B 27/283* (2013.01); *B32B 27/285* (2013.01); *B32B 27/32* (2013.01); *B32B 27/36* (2013.01); *B32B 27/365* (2013.01); *B32B 29/002* (2013.01); *C08F 20/28* (2013.01); *C08F 20/36* (2013.01); *C08F 122/14* (2013.01); *C08F 222/14* (2013.01); *C08J 3/242* (2013.01); *C08J 5/24* (2013.01); *C08K 3/22* (2013.01); *C08K 3/36* (2013.01); *C08K 7/06* (2013.01); *C08K 7/14* (2013.01); *C09J 5/00* (2013.01); *C09J 11/04* (2013.01); *C09J 11/08* (2013.01); *B32B 2255/00* (2013.01); *B32B 2255/26* (2013.01); *B32B 2262/101* (2013.01); *B32B 2307/516* (2013.01); *B32B 2307/518* (2013.01); *B32B 2419/00* (2013.01); *B32B 2479/00* (2013.01); *B32B 2605/00* (2013.01); *C08F 216/36* (2013.01); *C08F 216/38* (2013.01); *C08F 222/102* (2020.02); *C08F 222/145* (2020.02); *C08J 2335/02* (2013.01); *C08K 2003/2227* (2013.01); *C09J 135/02* (2013.01); *Y10T 428/31938* (2015.04); *Y10T 442/2738* (2015.04)

(58) Field of Classification Search
USPC ........ 524/544, 547; 428/297.1, 297.4, 320.2, 428/323, 327, 402, 411.1
See application file for complete search history.

(56) References Cited

U.S. PATENT DOCUMENTS

| | | |
|---|---|---|
| 2,212,506 A | 8/1940 | Bachman et al. |
| 2,245,567 A | 6/1941 | Brant et al. |

(Continued)

FOREIGN PATENT DOCUMENTS

| | | |
|---|---|---|
| CN | 102901754 A | 1/2013 |
| DE | 19508049 A1 | 9/1996 |

(Continued)

OTHER PUBLICATIONS

U.S. Appl. No. 14/948,734, filed Nov. 23, 2015.

(Continued)

*Primary Examiner* — Lynda Salvatore
(74) *Attorney, Agent, or Firm* — Ulmer & Berne LLP

(57) ABSTRACT

A composite material comprises a reinforcing material carried in a polymer matrix material which is the polymerization product of a polymerizable composition comprising a di-activated vinyl compound, with the proviso that the di-activated vinyl compound is not a cyanoacrylate. The reinforcing materials may be a wide variety of substrates including thermally sensitive materials. Exemplary composites can be molded and cured at ambient temperatures. Also disclosed are laminate materials having layered materials adhered by curing a di-activated vinyl polymerizable composition.

49 Claims, No Drawings

(51) Int. Cl.
*C09J 11/08* (2006.01)
*C08F 216/38* (2006.01)
*C08F 216/36* (2006.01)
*C09J 135/02* (2006.01)
*C08F 222/10* (2006.01)

(56) References Cited

U.S. PATENT DOCUMENTS

| | | |
|---|---|---|
| 2,277,479 A | 3/1942 | D'Alelio |
| 2,313,501 A | 3/1943 | Bachman et al. |
| 2,330,033 A | 9/1943 | D'Alelio |
| 2,403,791 A | 7/1946 | D'Alelio |
| 2,569,767 A * | 10/1951 | Knock .......... A61C 13/0001 433/199.1 |
| 2,726,204 A | 12/1955 | Kilbourne et al. |
| 2,730,457 A | 1/1956 | Green et al. |
| 3,042,710 A | 7/1962 | Dickstein et al. |
| 3,140,276 A | 7/1964 | Forster |
| 3,197,318 A | 7/1965 | Halpern et al. |
| 3,203,915 A | 8/1965 | D'Alelio |
| 3,221,745 A | 12/1965 | Coover, Jr. et al. |
| 3,385,777 A | 5/1968 | Haycock et al. |
| 3,427,250 A | 2/1969 | Haas et al. |
| 3,489,663 A | 1/1970 | Bayer et al. |
| 3,523,097 A | 8/1970 | Coover, Jr. et al. |
| 3,557,185 A | 1/1971 | Ito et al. |
| 3,591,676 A | 7/1971 | Hawkins et al. |
| 3,595,869 A | 7/1971 | Shuman |
| 3,677,989 A | 7/1972 | Jenkinson |
| 3,728,373 A | 4/1973 | Imohel et al. |
| 3,758,550 A | 9/1973 | Eck et al. |
| 3,759,797 A | 9/1973 | Masunaga et al. |
| 3,923,836 A | 12/1975 | Bender et al. |
| 3,936,486 A | 2/1976 | Egger et al. |
| 3,940,362 A | 2/1976 | Overhults |
| 3,945,891 A | 3/1976 | Aal et al. |
| 3,966,562 A | 6/1976 | Mukushi et al. |
| 3,975,422 A | 8/1976 | Buck |
| 3,978,422 A | 8/1976 | Rheinfelder |
| 3,995,489 A | 12/1976 | Smith et al. |
| 4,001,345 A | 1/1977 | Gorton et al. |
| 4,004,984 A | 1/1977 | Margen |
| 4,018,656 A | 4/1977 | Rogers et al. |
| 4,035,243 A | 7/1977 | Katz et al. |
| 4,036,985 A | 7/1977 | Amato et al. |
| 4,046,943 A | 9/1977 | Smith et al. |
| 4,049,698 A | 9/1977 | Hawkins et al. |
| 4,056,543 A | 11/1977 | Ponticello |
| 4,079,058 A | 3/1978 | Ackermann et al. |
| 4,080,238 A | 3/1978 | Wolinski et al. |
| 4,083,751 A | 4/1978 | Choi et al. |
| 4,102,809 A | 7/1978 | Smith et al. |
| 4,105,688 A | 8/1978 | Ami et al. |
| 4,118,422 A | 10/1978 | Klein |
| 4,140,584 A | 2/1979 | Margen |
| 4,148,693 A | 4/1979 | Williamson |
| 4,154,914 A | 5/1979 | Kuraya |
| 4,160,864 A * | 7/1979 | Ponticello .......... C09J 4/00 526/322 |
| 4,176,012 A | 11/1979 | Bryant |
| 4,186,058 A | 1/1980 | Katz et al. |
| 4,186,060 A | 1/1980 | Katz et al. |
| 4,198,334 A | 4/1980 | Rasberger |
| 4,224,112 A | 9/1980 | Childs |
| 4,229,263 A | 10/1980 | Childs |
| 4,236,975 A | 12/1980 | Childs |
| 4,237,297 A | 12/1980 | Rody et al. |
| 4,243,493 A | 1/1981 | Gruber et al. |
| 4,256,908 A | 3/1981 | Nishimura et al. |
| 4,282,067 A | 8/1981 | Katz et al. |
| 4,282,071 A | 8/1981 | Sherrod |
| 4,291,171 A | 9/1981 | Baum et al. |
| 4,313,865 A | 2/1982 | Teramoto et al. |
| 4,319,964 A | 3/1982 | Katz et al. |
| 4,329,479 A | 5/1982 | Yabutani et al. |
| 4,396,039 A | 8/1983 | Klenk et al. |
| 4,399,300 A | 8/1983 | Prange et al. |
| 4,411,740 A | 10/1983 | Flaningam et al. |
| 4,440,601 A | 4/1984 | Katz et al. |
| 4,440,910 A | 4/1984 | O'Connor |
| 4,443,624 A | 4/1984 | Prange et al. |
| 4,444,928 A | 4/1984 | Karrer |
| 4,450,067 A | 5/1984 | Angevine et al. |
| 4,483,951 A * | 11/1984 | Brenner .......... B32B 15/06 522/71 |
| 4,504,658 A | 3/1985 | Narisada et al. |
| 4,510,273 A | 4/1985 | Miura et al. |
| 4,517,105 A | 5/1985 | Laemmle et al. |
| 4,539,423 A | 9/1985 | Itatani et al. |
| 4,556,649 A | 12/1985 | Salzburg et al. |
| 4,560,723 A | 12/1985 | Millet et al. |
| 4,578,503 A | 3/1986 | Ishikawa et al. |
| 4,584,064 A | 4/1986 | Ciais et al. |
| 4,613,658 A | 9/1986 | Mathias et al. |
| 4,698,333 A | 10/1987 | Fauss et al. |
| 4,720,543 A | 1/1988 | McPherson et al. |
| 4,724,053 A | 2/1988 | Jasne |
| 4,727,801 A | 3/1988 | Yokoi et al. |
| 4,728,701 A | 3/1988 | Jarvis et al. |
| 4,736,056 A | 4/1988 | Smith et al. |
| 4,767,503 A | 8/1988 | Crescentini et al. |
| 4,769,464 A | 9/1988 | Sajtos |
| 4,783,242 A | 11/1988 | Robbins |
| 4,828,882 A | 5/1989 | Tsezos et al. |
| 4,835,153 A | 5/1989 | Kubota et al. |
| 4,840,949 A | 6/1989 | Korbonits et al. |
| 4,897,473 A | 1/1990 | Dombek |
| 4,914,226 A | 4/1990 | Di Trapani et al. |
| 4,931,584 A | 6/1990 | Bru-Magniez et al. |
| 4,932,584 A | 6/1990 | Yamazaki et al. |
| 5,021,486 A | 6/1991 | Galbo |
| 5,039,720 A | 8/1991 | Saatweber et al. |
| 5,064,507 A | 11/1991 | O'Donnell et al. |
| 5,142,098 A | 8/1992 | Bru-Magniez et al. |
| 5,162,545 A | 11/1992 | Etzbach et al. |
| 5,210,222 A | 5/1993 | O'Murchu |
| 5,227,027 A | 7/1993 | Topper |
| 5,259,835 A | 11/1993 | Clark et al. |
| 5,284,987 A | 2/1994 | Sikkenga et al. |
| 5,292,937 A | 3/1994 | Manning et al. |
| 5,312,864 A | 5/1994 | Wenz et al. |
| 5,328,687 A | 7/1994 | Leung et al. |
| 5,334,747 A | 8/1994 | Steffen |
| 5,397,812 A | 3/1995 | Usami et al. |
| 5,426,203 A | 6/1995 | Sohn et al. |
| 5,446,195 A | 8/1995 | Pacifici |
| 5,514,371 A | 5/1996 | Leung et al. |
| 5,514,372 A | 5/1996 | Leung et al. |
| 5,550,172 A | 8/1996 | Regula et al. |
| 5,565,525 A | 10/1996 | Morimoto et al. |
| 5,567,761 A | 10/1996 | Song |
| 5,575,997 A | 11/1996 | Leung et al. |
| 5,582,834 A | 12/1996 | Leung et al. |
| 5,624,669 A | 4/1997 | Leung et al. |
| 5,693,621 A | 12/1997 | Toepfer et al. |
| 5,817,742 A | 10/1998 | Toepfer et al. |
| 5,817,870 A | 10/1998 | Haas et al. |
| 5,886,219 A | 3/1999 | Steffen |
| 5,902,896 A | 5/1999 | Bauer |
| 5,952,407 A | 9/1999 | Rasoul et al. |
| 6,057,402 A | 5/2000 | Zhou et al. |
| 6,069,261 A | 5/2000 | Hoffmann et al. |
| 6,106,807 A | 8/2000 | Albayrak et al. |
| 6,143,352 A | 11/2000 | Clark et al. |
| 6,183,593 B1 | 2/2001 | Narang et al. |
| 6,210,474 B1 | 4/2001 | Romano, Jr. et al. |
| 6,211,273 B1 | 4/2001 | Bru-Magniez et al. |
| 6,225,038 B1 | 5/2001 | Smith et al. |
| 6,238,896 B1 | 5/2001 | Ozaki et al. |
| 6,245,933 B1 | 6/2001 | Malofsky et al. |
| 6,284,915 B2 | 9/2001 | Hirase et al. |
| 6,291,703 B1 | 9/2001 | Schaerfl, Jr. et al. |
| 6,376,019 B1 | 4/2002 | Leung |
| 6,395,737 B1 | 5/2002 | Defossa et al. |

(56) References Cited

U.S. PATENT DOCUMENTS

| | | |
|---|---|---|
| 6,395,931 B1 | 5/2002 | Carvalho et al. |
| 6,413,415 B1 | 7/2002 | Weiss et al. |
| 6,420,468 B2 | 7/2002 | Bru-Magniez et al. |
| 6,440,461 B1 | 8/2002 | Bru-Magniez et al. |
| 6,512,023 B1 | 1/2003 | Malofsky et al. |
| 6,518,677 B1 | 2/2003 | Capote et al. |
| 6,545,097 B2 | 4/2003 | Pinchuk et al. |
| 6,559,264 B1 | 5/2003 | Konig et al. |
| 6,610,078 B1 | 8/2003 | Bru-Magniez et al. |
| 6,613,934 B1 | 9/2003 | Jegelka et al. |
| 6,673,957 B2 | 1/2004 | Bartek et al. |
| 6,699,928 B2 | 3/2004 | Cobbley et al. |
| 6,716,355 B1 | 4/2004 | Hanemaaijer et al. |
| 6,750,298 B1 | 6/2004 | Bru-Magniez et al. |
| 6,794,365 B2 | 9/2004 | Al-Obeidi et al. |
| 6,841,064 B1 | 1/2005 | Weiss et al. |
| 6,936,140 B2 | 8/2005 | Paxton et al. |
| 7,070,675 B2 | 7/2006 | Schmidt et al. |
| 7,109,369 B2 | 9/2006 | Nose et al. |
| 7,169,727 B2 | 1/2007 | Thorman |
| 7,208,621 B2 | 4/2007 | Nose et al. |
| 7,226,957 B1 | 6/2007 | Scranton et al. |
| 7,305,850 B2 | 12/2007 | Tonkovich et al. |
| 7,450,290 B2 | 11/2008 | Xu et al. |
| 7,553,989 B2 | 6/2009 | Sawabe et al. |
| 7,603,889 B2 | 10/2009 | Cypes et al. |
| 7,610,775 B2 | 11/2009 | Tonkovich et al. |
| 7,649,108 B2 | 1/2010 | Schal et al. |
| 7,659,423 B1 | 2/2010 | McArdle |
| 7,663,000 B2 | 2/2010 | Dekkers et al. |
| 7,678,847 B2 | 3/2010 | Yan et al. |
| 7,771,567 B2 | 8/2010 | Rives et al. |
| 7,900,558 B2 | 3/2011 | Yokoi |
| 8,119,214 B2 | 2/2012 | Schwantes et al. |
| 8,206,570 B2 | 6/2012 | Deniau |
| 8,318,060 B2 | 11/2012 | Sundberg et al. |
| 8,425,999 B2 | 4/2013 | McArdle et al. |
| 8,609,885 B2 | 12/2013 | Malofsky et al. |
| 8,884,051 B2 | 11/2014 | Malofsky et al. |
| 9,108,914 B1 | 8/2015 | Malofsky et al. |
| 9,181,365 B2 | 11/2015 | Malofsky et al. |
| 9,217,098 B1 | 12/2015 | Stevenson et al. |
| 9,221,739 B2 | 12/2015 | Malofsky et al. |
| 9,234,107 B2 | 1/2016 | Malofsky et al. |
| 9,334,430 B1 | 5/2016 | Stevenson et al. |
| 9,481,640 B2 | 11/2016 | McArdle et al. |
| 9,512,058 B2 * | 12/2016 | Malofsky .............. C09J 133/06 |
| 2001/0005572 A1 | 6/2001 | Lobo et al. |
| 2001/0034300 A1 | 10/2001 | Yurugi et al. |
| 2002/0143128 A1 | 10/2002 | Cabioch et al. |
| 2002/0151629 A1 | 10/2002 | Buffkin et al. |
| 2003/0096069 A1 | 5/2003 | D'Alessio |
| 2003/0199655 A1 | 10/2003 | Yurugi et al. |
| 2004/0057914 A1 | 3/2004 | Bonda et al. |
| 2004/0057916 A1 | 3/2004 | Bonda et al. |
| 2004/0076601 A1 | 4/2004 | Bru-Magniez et al. |
| 2004/0082043 A1 | 4/2004 | Yadav et al. |
| 2004/0086243 A1 | 5/2004 | DiGiovanni et al. |
| 2004/0220060 A1 | 11/2004 | Bartley et al. |
| 2005/0106781 A1 | 5/2005 | Ogata |
| 2006/0001158 A1 | 1/2006 | Matayabas, Jr. et al. |
| 2006/0073334 A1 | 4/2006 | Schwantes et al. |
| 2006/0167267 A1 | 7/2006 | Chorghade et al. |
| 2006/0197236 A1 | 9/2006 | Basheer et al. |
| 2006/0211809 A1 | 9/2006 | Kodemura et al. |
| 2007/0043145 A1 | 2/2007 | Beck et al. |
| 2007/0049655 A1 | 3/2007 | Yoshimune et al. |
| 2007/0092483 A1 | 4/2007 | Pollock |
| 2007/0222051 A1 * | 9/2007 | Yoshimura .......... H01L 25/0657 257/678 |
| 2008/0131618 A1 | 6/2008 | Nakamura et al. |
| 2008/0160305 A1 | 7/2008 | Warren et al. |
| 2008/0187655 A1 | 8/2008 | Markle et al. |
| 2008/0227919 A9 | 9/2008 | Li et al. |
| 2008/0241485 A1 | 10/2008 | Shimohara et al. |
| 2008/0286333 A1 | 11/2008 | Kangas et al. |
| 2009/0087151 A1 | 4/2009 | Benjamin et al. |
| 2009/0200652 A1 | 8/2009 | Oh et al. |
| 2009/0203861 A1 | 8/2009 | Lee et al. |
| 2009/0263604 A1 | 10/2009 | Arai et al. |
| 2009/0286433 A1 | 11/2009 | Watanabe |
| 2009/0289032 A1 | 11/2009 | Flanagan et al. |
| 2010/0016508 A1 | 1/2010 | Sasagawa et al. |
| 2010/0059179 A1 | 3/2010 | Tribelhorn et al. |
| 2010/0124649 A1 | 5/2010 | Rukavina et al. |
| 2010/0256720 A1 | 10/2010 | Overstreet et al. |
| 2010/0286438 A1 | 11/2010 | Malofsky et al. |
| 2011/0015406 A1 | 1/2011 | Umetani et al. |
| 2011/0024392 A1 | 2/2011 | Sato et al. |
| 2011/0151243 A1 | 6/2011 | McArdle et al. |
| 2011/0164322 A1 | 7/2011 | Morozumi et al. |
| 2011/0244010 A1 | 10/2011 | Doshi |
| 2011/0255156 A1 | 10/2011 | Jethmalani et al. |
| 2012/0083523 A1 | 4/2012 | Richard et al. |
| 2012/0136130 A1 | 5/2012 | Takashima et al. |
| 2012/0261807 A1 | 10/2012 | Itoh et al. |
| 2012/0315388 A1 | 12/2012 | Burckhardt et al. |
| 2013/0281580 A1 | 10/2013 | Malofsky et al. |
| 2013/0303719 A1 | 11/2013 | Malofsky et al. |
| 2014/0058031 A1 | 2/2014 | Overbeek et al. |
| 2014/0173889 A1 | 6/2014 | Johnson et al. |
| 2014/0248485 A1 | 9/2014 | Malofsky et al. |
| 2014/0275400 A1 | 9/2014 | Chen et al. |
| 2014/0288230 A1 | 9/2014 | Malofsky et al. |
| 2014/0329980 A1 | 11/2014 | Malofsky et al. |
| 2015/0056879 A1 | 2/2015 | Malofsky et al. |
| 2015/0104660 A1 | 4/2015 | Malofsky et al. |
| 2015/0148480 A1 | 5/2015 | Ellison et al. |
| 2015/0210894 A1 | 7/2015 | Malofsky et al. |
| 2015/0303122 A1 | 10/2015 | Malofsky et al. |
| 2015/0361283 A1 | 12/2015 | Malofsky et al. |

FOREIGN PATENT DOCUMENTS

| | | |
|---|---|---|
| EP | 1505090 A1 | 2/2005 |
| FR | 2788516 A1 | 7/2000 |
| GB | 432628 | 7/1935 |
| GB | 965676 | 8/1964 |
| GB | 965767 | 8/1964 |
| GB | 975733 | 11/1964 |
| JP | S5681537 A | 7/1981 |
| JP | 02-281013 | 11/1990 |
| JP | H08231564 | 9/1996 |
| JP | 09258448 A | 10/1997 |
| JP | 200019936 | 7/2000 |
| JP | 2004-304125 A | 10/2004 |
| JP | 2008174494 | 1/2007 |
| JP | 2011-025247 A | 2/2011 |
| WO | 1999/046619 | 9/1999 |
| WO | 99/055394 | 11/1999 |
| WO | 0121326 A1 | 3/2001 |
| WO | 2006-098514 A1 | 9/2006 |
| WO | 2007/120630 | 10/2007 |
| WO | 2010/129068 A1 | 11/2010 |
| WO | 2011/059104 | 12/2011 |
| WO | 2011/161045 | 12/2011 |
| WO | 2012/054616 A2 | 4/2012 |
| WO | 2012/054633 A2 | 4/2012 |
| WO | 2013059473 A2 | 4/2013 |
| WO | 2013/066629 | 5/2013 |
| WO | 2013/149173 A1 | 10/2013 |
| WO | 2013149165 A1 | 10/2013 |
| WO | 2013149168 A1 | 10/2013 |

OTHER PUBLICATIONS

U.S. Appl. No. 15/094,705, filed Apr. 8, 2016.

Bachman et al.: "Diethyl methylenemalonate", May 17, 1939, Eastman Kodak Company, pp. 493-501.

P. Breton et al., "New Poly(Methylidene Malonate 2.1.2) Nanoparticles: Recent Developments", Targeting of Drugs 4, NATO ASI Series, vol. 273, pp. 161-172, 1994.

(56) References Cited

OTHER PUBLICATIONS

Limouzin et al., "Anionic Polymerization of n-Butyl Cyanoacrylate in Emulsion and Miniemulsion" Macromolecules, vol. 36, 2003, pp. 667-674.
"Knoevenagel reaction on a molecular sieve", Li Qifang et al., Chinese Science Bulletin, vol. 12, pp. 914-917.
"Knoevenagel Condensation Over Acidic Zeolite", Zuo Bojun et al., Chinese Journal of Catalysis, vol. 23 (6), pp. 555-558.
"Comparison of the catalytic activity of MOFs and zeolites in Knoevenagel condensation", Maksym Opanasenko, et al., Catalysis Science & Technology, vol. 3 p. 500-507.
Corey et al. "Total Synthesis of Gibberellic Acid. A Simple Synthesiss of a Key Intermediate", J. Am. Chem. Soc. 1982, 104, 6129-6130.
Krishna et al. "Stereodefined Access to 3-Deoxy Sugars Through a Tandem Baylis-Hillman and Lewis Acid Catalyzed Reaction Sequence", European Journal of Organic Chemistry, 2010, 813-817.
International Preliminary Report on Patentability in App No. PCT/US2013/070355 dated May 19, 2015.
European Search Report of the European Patent Office, Issued in European Application No. 13767993.2-1302 / 831185; dated Jan. 7, 2016; 14 pages.
Ware et al.: "DBU: An Efficient Catalyst for Knoeveganel Condensation under Solvent-free Condition," Bulletin of the Catalysis Society of India, (2007), vol. 6, pp. 104-106.
V. G. Nenajdenko et al.: "Reaction of 2-Methylene-1 ,3-Dicarbonyl Compounds Containing a CF3-Group with 1 ,3-Dienes," Tetrahedron, (2000), vol. 56, pp. 6549-6556.
J. S. Yadav et al: "Phosphane-Catalyzed Knoevenagel Condensation: a Facile Synthesis of a-Cyanoacrylates and a-Cyanoacrylonitriles," Eur. J. Orq. Chem. (2004), pp. 546-551.
B. C. Ranu et al.: "Ionic Liquid as Catalyst and Reaction Medium—a Simple, Efficient and Green Procedure for Knoevenagel Condensation of Aliphatic and Aromatic Carbonyl Compounds Using a Task-Specific Basic Ionic Liquid," Euro. J. Org. Chem., (2006), pp. 3767-3770.
H. A. Oskooie et al.: "On Water: an Efficient Knoevenagel Condensation using 12-Tungstophosphoric Acid as a Reusable Green Catalyst," Synthetic Communications, (2006), vol. 36, pp. 2819-2823.
H. Jiang et al.: "Inorganic Zinc Salts Catalyzed Knoevenagel Condensation at Room Temperature without Solvent," Preparative Biochemistry & Biotechnology, (2009), vol. 39, pp. 194-200.
B. M. Reddy et al.: "An Easy-to-use Heterogeneous Promoted Zirconia Catalyst for Knoevenagel Condensation in liquid Phase under Solvent-Free conditions," Journal of Molecular Catalysis A: Chemical, (2006), vol. 258, pp. 302-307.
D. H. Jung et al.: "New and General Methods for the Synthesis of Arylmethylene Bis(3-Hydroxy-2-Cyclohexene-1-Ones) and Xanthenediones by EDDA and in(OTf)3-Catalyzed One-Pot Domino Knoevenagel/Michael or Koevenagel/Michael/Cyclodehydration Reactions," Bull. Korean Chem. Soc. (2009) vol. 30, No. 9, pp. 1989-1995.
P. Klemarczyk: "Adhesion Studies of Mixtures of Ethyl Cyanoacrylate with a Difunctional Cyanoacrylate Monomer and with other Electron-deficient Olefins," J. Adhesion, (1999), vol. 69, pp. 293-306.
P. Klemarwczyk: "A General Synthesis of 1,1 Disubstituted Electron Deficient Olefins and their Polymer Properties," Polymer, (1998), vol. 39, No. 1, pp. 173-181.
Gill, Charansingh, et al. "Knoevenagel condensation in neutral media: A simple and efficient protocol for the synthesis if electrophillic alkenes catalyzed by anhydrous ferric sulphate with remarkable reusability." Bulletin of the Catalysis Society of India 7 (2008): 153-157.
P. Ballesteros et al.: "Dl-tert-Butyl Methylenemalonate [Propanedioic Acid, Methylene-, bis(1, 1-dimethylethyl)ester]," Organic Syntheses. Coil. (1990), vol. 7, p. 142 ; (1986) vol. 64, p. 63.
A. M. Vetrova et al.: "Improvement of the Thermal Stability of Cyanoacrylate Adhesives," Polymer Science, Series D, (2009), vol. 2, No. 1, pp. 27-30.

A. C. Cope: "Condensation Reactions. I. The Condensation of Ketones with Cyanoacetic Esters and the Mechanism of the Knoevenagel Reaction," Condensation of Ketones with Cyanoacetic Esters, (1937), vol. 59, pp. 2327-2330.
G. Lai et al.: "Ionic Liquid Functionalized Silica Gel: Novel Catalyst and Fixed Solvent," Tetrahedron Letters (2006), vol. 47, pp. 6951-6953.
J.R. Harjani et al.: "Lewis Acidic Ionic Liquids for the Synthesis of Electrophilic Alkenes via the Knoevenagel Condensation," Tetrahedron Letters, (2002), vol. 43, pp. 1127-1130.
P. Ballesteros et al.: "Synthesis of Dl-tert-Butyl Methylenemalonate, a Sterically Hindered 1,1-Dicarbonyl Alkene," J. Org. Chem, (1983), vol. 48, pp. 3603-3605.
T. Doi et al.: "Synthesis of Dimethyl gloiosiphne A by Way of Palladium-Catalyzed Domino Cyclization," J. Org. Chem., (2007), vol. 72, pp. 3667-3671.
Takagi et al.: Kogyo Kagaku Zasshi, Reaction of Active Methylene Radicals with Formaldehyde. L. Synthesis of Diethyl Methylenemalonate, 1953, 56, pp. 901-903, English abstract.
McNab, Kirk-Othmer Encyclopedia of chemical Technology, Pyrolysis, Flash Vacuum, 2009, John Wiley & Sons, Inc., pp. 1-26.
Block, "Diethyl bis (hydroxymethyl) malonate" Organic Syntheses, 1973, Coll. vol. 5, p. 381 [vol. 40, p. 27 (1960); Retrieved on Apr. 4, 2014 from internet: http://www.Orgsyn.org/content/pdfs/procedures/cv5p0381.pdf] p. 381, para 1. 1781-026 WO.
Magdalini Matziari et al. "Active methylene phosphinic peptides: a new diversification approach", Organic Letters., vol. 8, No. 11, 2006, pp. 2317-2319, USACS, Washington DC, ISSN: 1523-7060.
Zaragoza Dorwald, Side Reactions in Organic Synthesis, 2005, Wiley-VCH Verlag GmbH & Co., KgaA, Weinheim, Preface. p. IX.
K. Okamura and T. Date, A Facile Conversion of Ethoxydihydropyrans to 4-Cyanoethylisoxazoles, J. Heterocyclic Chem. 33, 383 (1996).
Valentine G. Nenajdenko et al, Reaction of 2-Methylene-1,3-dicarbonyl Compounds Containing a CF3-Group with 1,3-Dienes Tetrahedron 56 (2000) 6549-6556.
Yamauchi et al. "Reactivity of 2-methyene-1,3-dicarbonyl compounds: catalytic enantioselective Diels-Alder reaction", Tetrahedron Asymetry 12, (2001), 3113-3118.
Cristoph Schotes et al. "Cu(I)- and C(II)- Catalyzed Cyclo- and Michael Addition Reactions of Unsaturated [beta]-Ketoesters" The Journal of Organic Chemistry, vol. 76, No. 14 dated Jul. 15, 2011 p. 5862-5866.
Alejandro Bugarin et al. "Efficient direct [alpha]-methylenation of carbonyls mediated by dissopropylammonium trifluoroacetate", Chemical Communications, vol. 46, No. 10 dated Jan. 1, 2010.
H. Hoffman et al. "Preparation and Selected Reaction of tery-Butyl 2-Methylene-3-oxoalkanoates" Chem. Ber., vol. 124 dated Jan. 1, 1991, pp. 2475-2480.
M. Yamauchi et al. "Reactivity of 2-Methylene-1, 3-dicarbonyl Compounds. 1,3-Dipolar Cycloaddition Reaction with Ethyl Diazoacetate", Chem. Pham. Bull., vol. 49, No. 12, dated Jan. 1, 2001, pp. 1638-1639.
Lawrence N J et al. "Reaction of Baylis-Hillman products with Swern and Dess-Martin oxidants", Tetrahedron Letters, Pergamon, GB, vol. 42 No. 23 dated Jun. 4, 2001, pp. 3939-3941.
Juliana Vale et al. "Efficient [alpha]-Methylenation of Carbonyl Compounds in Ionic Liquids at Room Temperature", Synlett, vol. 2009, No. 01, Jan. 1, 2009 (Jan. 1, 2009), pp. 75-78, XP055170349, ISSN: 0936-5214, DOI: 10.1055/s-0028-1087389 *table 2; compound 3 *.
Weiss et al. Miniemulsion Polymerization as a Means to Encapsulate Organic and Inorganic Materials, Adv. Polymer Science, 2010, pp. 1-52, DOI:10.1007/12_2010_61.
Bhatia, Encapsulation of Particles Using Brittle Subterranean Applications, Thesis submitted to College of Engineering and Mineral Resources at West Virginia University in partial fulfillment of the requirements for the degree of Master of Science in Chemical Engineering, 1999.
McFarland et al, Free Radical Frontal Polymerization with a Microencapsulated Initiator, Macromolecules 2004, vol. 37, pp. 6670-6672.

(56) References Cited

OTHER PUBLICATIONS

International Search Report (ISR) and Written Opinion of the Searching Authority in App. No. PCT/US2014/011068 dated May 12, 2014.
International Search Report (ISR) and Written Opinion of the Searching Authority in App. No. PCT/US2011/056903 dated Jun. 7, 2012.
International Search Report (ISR) and Written Opinion of the Searching Authority in App. No. PCT/US2011/056926 dated Feb. 28, 2012.
International Search Report (ISR) and Written Opinion of the Searching Authority in App. No. PCT/US2012/060830 dated Feb. 1, 2013.
International Search Report (ISR) and Written Opinion of the Searching Authority in App. No. PCT/US2012/060840 dated Mar. 12, 2013.
International Search Report (ISR) and Written Opinion of the Searching Authority in App. No. PCT/US2012/060837 dated Jan. 9, 2013.
International Search Report (ISR) and Written Opinion of the Searching Authority in App. No. PCT/US2013/034636 dated Jun. 20, 2013.
International Search Report (ISR) and Written Opinion of the Searching Authority in App. No. PCT/US2013/034641 dated Jun. 25, 2013.
International Search Report (ISR) and Written Opinion of the Searching Authority in App. No. PCT/US2013/034649 dated Aug. 27, 2013.
International Search Report (ISR) and Written Opinion of the Searching Authority in App. No. PCT/US2013/043711 dated Nov. 22, 2013.
International Search Report (ISR) and Written Opinion of the Searching Authority in App. No. PCT/US2013/070355 dated Mar. 19, 2014.
International Search Report (ISR) and Written Opinion of the Searching Authority in App. No. PCT/US2013/072203 dated Apr. 18, 2014.
M. McCoy, "A New Way to Stick" Chemical & Engineering News, vol. 26, Issue 26 (Jun. 30, 2014), pp. 17-18.
International Search Report (ISR) and Written Opinion of the Searching Authority in App No. PCT/US2015/047445 dated Nov 30, 2015.
International Search Report (ISR) and Written Opinion of the Searching Authority in App No. PCT/US2015/047466 dated Dec 1, 2015.
International Search Report (ISR) and Written Opinion of the Searching Authority in App No. PCT/US2015/048846 dated Dec 4, 2015.
European Search Report of the European Patent Office, Issued in European Application No. 13770173.6-1301 / 831124; dated Oct. 9, 2015; 7 pages.
International Search Report (ISR) and Written Opinion of the Searching Authority in App No. PCT/US2016/027134 dated Jul. 15, 2016, 7 pages in its entirety.
International Search Report (ISR) and Written Opinion of the Searching Authority in App No. PCT/US2016/027099 dated Jul. 15, 2016, 8 pages in its entirety.
International Preliminary Report on Patentability in App No. PCT/US2013/070355 dated as report dated May 19, 2015, 6 pages in its entirety.

* cited by examiner

COMPOSITE AND LAMINATE ARTICLES AND POLYMERIZABLE SYSTEMS FOR PRODUCING THE SAME

CROSS REFERENCE TO RELATED APPLICATIONS

This application is a 35 U.S.C. § 371 National Phase Application of International PCT Patent Application No. PCT/US2013/034641, filed Mar. 29, 2013, which application claims the benefit of priority to U.S. Provisional Patent Application 61/618,154, filed Mar. 30, 2012 entitled Composite and Laminate Articles and Polymerizable Systems for Producing the Same, the contents of each of which are hereby incorporated herein by reference in their entireties.

INCORPORATION BY REFERENCE

All documents cited or referenced herein and all documents cited or referenced in the herein cited documents, together with any manufacturer's instructions, descriptions, product specifications, and product sheets for any products mentioned herein or in any document incorporated by reference herein, are hereby incorporated by reference, and may be employed in the practice of the invention.

BACKGROUND OF THE INVENTION

1. Field of the Invention

Exemplary embodiments disclosed herein relate to composite and laminate structures and polymerizable systems therefor. Of particular interest are polymerizable di-substituted, di-activated vinyl compositions such as, but not limited to, methylene malonates, methylene β-ketoesters, methylene β-diketones, dialkyl disubstituted vinyl, dihaloalkyl disubstituted vinyl, whether monofunctional, difunctional or multifunctional monomers, oligomers or polymers.

2. Background

Methylene malonates are compounds having the general formula (I):

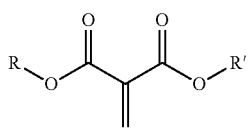

(I)

wherein R and R' may be the same or different and may represent nearly any substituent or side-chain. Such compounds have been known since 1886 where the formation of diethyl methylene malonate was first demonstrated by W. H. Perkin, Jr. (Perkin, Ber. 19, 1053 (1886)).

However, earlier methods for producing methylene malonates suffer significant deficiencies that preclude their use in obtaining commercially viable monomers. Such deficiencies include unwanted polymerization of the monomers during synthesis, formation of undesirable side products, degradation of the product, insufficient and/or low yields, and ineffective and/or poorly functioning monomer product. These problems have impinged on their practical use in the production of commercial and industrial products.

Certain co-inventors of the instant application have recently filed patent applications on improved methods of synthesis of methylene malonates, namely, PCT/US11/056903 Synthesis of Methylene Malonates Substantially Free of Impurities, and PCT/US11/056926 Synthesis of Methylene Malonates Using Rapid Recovery in the Presence of a Heat Transfer Agent. The synthesis procedures provided therein result in improved yields of heretofore elusive high quality methylene malonates and other polymerizable compositions.

The polymerizable compositions are amenable to chain-building and/or cross-linking polymerization by anionic or free radical initiation and have the potential to form the basis of a highly valuable and large-scale platform for the chemical synthesis and formulation of new chemical products.

Composites are generally defined as materials made from two or more constituent materials with significantly different physical or chemical properties, that when combined, produce a material with characteristics different from the individual constituents. The individual constituents remain separate and distinct in the finished composite structure.

Some typical composite materials include building materials such as cements and concrete, reinforced plastics such as fiber-reinforced polymers, metal composites, and ceramic composites. In the art there is interest in expanding and improving composite materials and their manufacturing processes, including wood-plastic composites. The term "wood-plastic composites" refers to any composites that contain wood (of any form) and thermosets or thermoplastics. Such composites are attractive alternatives to metals or thermoplastics for applications in which materials are place under severe stress or environmental challenges, or for where large-sized wood components are not practical. For example, Oriented Strand Board (OSB) is an engineered structural-use panel typically manufactured from thin wood strands bonded together with resin under heat and pressure, and is used extensively for roof, wall, and floor sheathing in residential and commercial construction. U.S. Pat. No. 3,958,069 to Gaylord discusses wood-plastic composites and problems often encountered in the art. However, the solutions proposed therein include application of heat and pressure to induce polymerization. A system that eliminates the heat required for cure and that simultaneously accelerates cure times would have clear economic and process simplification benefits.

Additionally, society could greatly benefit from new technologies that deliver a low or zero energy input, very fast polymerizing platform, that could be designed to be environmentally, biologically or metabolically compatible with most living organisms that is also either in whole or part made from a broad sustainable resource base, including sugars, atmospheric gases, waste gases and synthesis gas.

Although useful in many applications, known composites suffer from several drawbacks including manufacturing issues, long cure times, complex fabrication equipment, high energy costs, limitations on raw materials (e.g., thermally resistant reinforcing materials), and exposure to toxic chemicals at unacceptable levels. Further, even though greatly desired in the art, economies of scale are still not well developed. As a result, composites may be more expensive than traditional materials and designers must choose between advantages offered by composite material and other lower-cost alternatives.

Thus, for both composites and laminates, there remains a long-felt need in the art for materials that provide the desired physical performance without the attendant difficulties mentioned above or high energy requirements.

SUMMARY OF THE INVENTION

Accordingly, exemplary embodiments disclosed herein meet these and other needs by providing new classes of commercially viable products, in particular, composite and laminate binders, matrices, assembly systems, structures and articles comprising such structures. Exemplary systems provide on-demand, high speed, 100% or near 100% solids, low catalyst systems that do not require substantial energy for curing. Additionally, exemplary embodiments optionally include crosslinkable systems. Embodiments disclosed herein provide environmentally, biologically and/or metabolically compatible systems that address clear and heretofore unmet needs.

Exemplary systems disclosed herein offer elimination or substantial reduction of energy use on application and cure, the elimination of complex solvent handling and recovery equipment (including water), the elimination of the equipment required to initiate and/or accelerate cure, and the ability to use thermally sensitive substrates. For example, components (composites or laminates) utilizing the principles disclosed herein can use thermally sensitive material that unable to withstand high heat, such as, for example, greater than 100° C. Systems disclosed herein can provide a complex, multilayer laminate having a near instantaneous cure to dramatically reduce assembly time, allowing for just-in-time supply arrangements on short notice in, for example, the packaging industries.

Also disclosed are binder systems for a myriad of composite types, including fiber reinforced, aggregate or particle reinforced and/or laminar reinforced composites. The binder system may be designed as a 100% solids reactive composition that could cure, if desired, nearly instantaneously, that is, on contact after wetting the reinforcement, with little or no energy input required for cure.

Exemplary systems eliminate the need for high catalyst loading and complex, mixing and metering systems. Finally, such systems dramatically reduce leaching of non-bound chemical elements and provide for more facile activation.

Exemplary systems allow changes in the types of materials for use in manufacturing the related substrates. For example, certain thermoplastics or decorative elements may not survive a typical cure cycle (350° F. or higher for 20 minutes or more), but at ambient temperatures virtually any known material could be utilized, such as highly oriented polyethylene fibers, which lose all their critical properties upon heating above typically 165° F. to 200° F.

Exemplary systems also include high performance composites that offer properties better than conventional structural metals, ceramics and related materials. Such composites may use continuous, oriented fibers in polymer, metal or ceramic matrices to obtain the superior properties. Exemplary systems offer very high thermal resistance without the need for elevated temperature curing.

In one aspect, the invention provides a composite material comprising:
a polymer material; and
a reinforcing or filler material;
wherein the polymer material comprises a polymerization product of a polymerizable composition comprising a di-activated vinyl compound, with the proviso that the di-activated vinyl compound is not a cyanoacrylate.

In one embodiments of the composite material, the di-activated vinyl compound comprises at least one member of the group consisting of a methylene malonate, a methylene betaketoester, a methylene betadiketone.

In one embodiment of the composite material, the methylene malonate monomer, wherein the methylene malonate monomer is represented by the formula: $R^1$—O—C(O)—C(=CH$_2$)—C(O)—O—$R^2$, wherein $R^1$, $R^2$ are independently C1-C15 alkyl, C2-C15 alkenyl, halo-(C1-C15 alkyl), C3-C6 cycloalkyl, halo-(C3-C6 cycloalkyl), heterocyclyl, heterocyclyl-(C1-C15 alkyl), aryl-(C1-C15 alkyl), heteroaryl or heteroaryl-(C1-C15 alkyl), or alkoxy-(C1-15 alkyl), each of which may be optionally substituted by C1-C15 alkyl, halo-(C1-C15 alkyl), C3-C6 cycloalkyl, halo-(C3-C6 cycloalkyl), heterocyclyl, heterocyclyl-(C1-C15 alkyl), aryl, aryl-(C1-C15 alkyl), heteroaryl, C1-C15 alkoxy, C1-C15 alkylthio, hydroxyl, nitro, azido, acyloxy, carboxy, ester or sulfonyl;

or wherein $R^1$ and $R^2$ are taken together with the atoms to which they are bound to form a 5-7 membered heterocyclic ring which may be optionally substituted by C1-C15 alkyl, halo-(C1-C15 alkyl), C3-C6 cycloalkyl, halo-(C3-C6 cycloalkyl), heterocyclyl, heterocyclyl-(C1-C15 alkyl), aryl, aryl-(C1-C15 alkyl), heteroaryl, C1-C15 alkoxy, C1-C15 alkylthio, hydroxyl, nitro, azido, acyloxy, carboxy, ester or sulfonyl.

In another embodiment of the composite material, the methylene betaketoester monomer is represented by structure: $R^3$—C(O)—C(=CH$_2$)—C(O)—O—$R^4$, wherein $R^3$, $R^4$ are independently C1-C15 alkyl, C2-C15 alkenyl, halo-(C1-C15 alkyl), C3-C6 cycloalkyl, halo-(C3-C6 cycloalkyl), heterocyclyl, heterocyclyl-(C1-C15 alkyl), aryl, aryl-(C1-C15 alkyl), heteroaryl or heteroaryl-(C1-C15 alkyl), or alkoxy-(C1-15 alkyl), each of which may be optionally substituted by C1-C15 alkyl, halo-(C1-C15 alkyl), C3-C6 cycloalkyl, halo-(C3-C6 cycloalkyl), heterocyclyl, heterocyclyl-(C1-C15 alkyl), aryl, aryl-(C1-C15 alkyl), heteroaryl, C1-C15 alkoxy, C1-C15 alkylthio, hydroxyl, nitro, azido, acyloxy, carboxy, or ester;

or
wherein $R^3$ and $R^4$ are taken together with the atoms to which they are bound to form a 5-7 membered heterocyclic ring which may be optionally substituted by C1-C15 alkyl, halo-(C1-C15 alkyl), C3-C6 cycloalkyl, halo-(C3-C6 cycloalkyl), heterocyclyl, heterocyclyl-(C1-C15 alkyl), aryl, aryl-(C1-C15 alkyl), heteroaryl, C1-C15 alkoxy, C1-C15 alkylthio, hydroxyl, nitro, azido, acyloxy, carboxy, or ester.

In still another embodiment of the composite material, the methylene betadiketone monomer is represented by the structure: $R^5$—C(O)—C(=CH$_2$)—C(O)—$R^6$, wherein $R^5$ and $R^6$ are independently C1-C15 alkyl, C2-C15 alkenyl, halo-(C1-C15 alkyl), C3-C6 cycloalkyl, halo-(C3-C6 cycloalkyl), heterocyclyl, heterocyclyl-(C1-C15 alkyl), aryl, aryl-(C1-C15 alkyl), heteroaryl or heteroaryl-(C1-C15 alkyl), or alkoxy-(C1-15 alkyl), each of which may be optionally substituted by C1-C15 alkyl, halo-(C1-C15 alkyl), C3-C6 cycloalkyl, halo-(C3-C6 cycloalkyl), heterocyclyl, heterocyclyl-(C1-C15 alkyl), aryl, aryl-(C1-C15 alkyl), heteroaryl, C1-C15 alkoxy, C1-C15 alkylthio, hydroxyl, nitro, azido, acyloxy, carboxy, or ester;

or
wherein $R^5$ and $R^6$ are taken together with the atoms to which they are bound to form a 5-7 membered heterocyclic ring which may be optionally substituted by C1-C15 alkyl, halo-(C1-C15 alkyl), C3-C6 cycloalkyl, halo-(C3-C6 cycloalkyl), heterocyclyl, heterocyclyl-(C1-C15 alkyl), aryl, aryl-(C1-C15 alkyl), heteroaryl, C1-C15 alkoxy, C1-C15 alkylthio, hydroxyl, nitro, azido, acyloxy, carboxy, or ester.

In another embodiment of the composite material, the polymerizable composition comprises a monomer formed from the following specifically identified malonic acid esters: dimethyl, diethyl, ethylmethyl, dipropyl, dibutyl, diphenyl, and ethyl-ethylgluconate, among others.

In yet another embodiment of the composite material, the polymerizable composition comprises a multifunctional monomer or oligomer. In certain embodiments, the multifunctional monomer or oligomer comprises at least two units represented by the structure: —W—C(O)—C(=CH$_2$)—C(O)—W—, where W represents —O— or a direct bond. In still other embodiments, the multifunctional monomer or oligomer is a transesterification product of a di-activated vinyl compound with a diol or a polyol.

In another embodiment of the composite material, the polymerizable composition comprises a blend of at least one multifunctional monomer or oligomer and at least one mono-functional monomer. In other embodiments, the multifunctional monomer or oligomer is present in the blend in an amount selected from at least 2%, at least 5%, and at least 10% by weight of the blend.

In another embodiment of the composite material, the reinforcing or filler material comprises at least one member of the group consisting of: particulates, glass, natural and synthetic fiber, woven and non-woven fabric, nano particles, carbon, clay, fiberglass, carbon fiber, wood particles, wood shavings, wood flour, alumina, silica, sand, plastics, polycarbonate, acrylonitrile butadiene styrene, aluminized fiberglass, veil mat, fiberglass mat, biaxial cloth, release fabric, carbon fiber cloth, fumed silica, polyethylene fibers, polypropylene fibers, titania, and aramid fiber.

In another aspect, the invention provides an article of manufacture comprising the composite material of the invention. In certain embodiments, the article is at least one member of the group consisting of an automotive component, an architectural component, a sporting goods component, a friction industry component, a high performance composite component, a dental component, a building component, a furniture component, a marine component, an aerospace component, a wind turbine component. In other embodiments, the article of manufacture further comprises at least one thermally sensitive material unable to withstand applied heat of greater than 100 C.

In still another aspect, the invention provides, a system for preparing a composite material, comprising:
  a) a polymerizable composition;
  b) a reinforcing or filler material; and
  c) means for molding said polymerizable composition and reinforcing material into a composite material.

In certain embodiments, the system for preparing a composite material according to the invention further comprises a polymerization activator. In some embodiments, the polymerization activator is present in or on the reinforcing or filler material. In other embodiments, the polymerization activator is present in a pure form, in a dilute form, fugitive or non-fugitive form. In still other embodiments, the polymerization activator includes a base, a base precursor, a base creator, or a base enhancer. In still other embodiments, the polymerization activator is selected from an organic material, an inorganic material or an organo-metallic material, or a combination thereof. In specific embodiments, the polymerization activator is at least one member selected from: sodium acetate; potassium acetate; acid salts of sodium, potassium, lithium, copper, and cobalt; tetrabutyl ammonium fluoride, chloride, and hydroxide; an amine whether primary, secondary or tertiary; an amide; salts of polymer bound acids; benzoate salts; 2,4-pentanedionate salts; sorbate salts; propionate salts; secondary aliphatic amines; piperidene, piperazine, N-methylpiperazine, dibutylamine, morpholine, diethylamine, pyridine, triethylamine, tripropylamine, triethylenediamine, N,N-dimethylpiperazine, butylamine, pentylamine, hexylamine, heptylamine, nonylamine, decylamine; salts of amines with organic mono-carboxylic acids; piperidine acetate; metal salt of a lower monocarboxylic acid; copper(II) acetate, cupric acetate monohydrate, potassium acetate, zinc acetate, zinc chloracetate, magnesium chloracetate, magnesium acetate; salts of acid containing polymers; salts of polyacrylic acid copolymers.

In certain embodiments, the system for preparing a composite material according to the invention further comprises a formulation additive. In certain embodiments, the formulation additive is at least one member selected from: plasticizers, thixotropic agents, adhesion promoters, antioxidants, light stabilizers, UV stabilizers, fillers, surfactants, wetting agents, viscosity modifiers, extenders, dispersants, anti-blocking agents, defoamers, air release agents, anti-sagging agents, anti-setting agents, matting agents, flattening agents, waxes, anti-mar additives, anti-scratch additives, inert resins.

In another aspect the invention provides, a laminate adhesive comprising:
a polymerization product of a polymerizable composition comprising a di-activated vinyl compound, with the proviso that the di-activated vinyl compound is not a cyanoacrylate.

In certain embodiments of the laminate adhesive according to the invention, the di-activated vinyl compound comprises at least one member of the group consisting of a methylene malonate, a methylene betaketoester, a methylene betadiketone. In other embodiments, the polymerizable composition comprises a multifunctional monomer or oligomer. In still other embodiments, the multifunctional monomer or oligomer comprises at least two units represented by the structure: —W—C(O)—C(=CH$_2$)—C(O)—W—, where W represents —O— or a direct bond. In yet other embodiments, the polymerizable composition comprises a blend of at least one multifunctional monomer or oligomer and at least one mono-functional monomer. In specific embodiments, the multifunctional monomer or oligomer is present in the blend in an amount selected from at least 2%, at least 5%, and at least 10% by weight of the blend.

In another aspect, the invention provides a method for preparing a laminate material comprising
  a) providing a first substrate;
  b) applying to said first substrate a laminate adhesive comprising:
a polymerizable composition comprising a di-activated vinyl compound, with the proviso that the di-activated vinyl compound is not a cyanoacrylate; and
  c) adhering a second substrate to said first substrate by curing of the laminate adhesive.

In certain embodiments of the laminate preparation method, the method further comprises the step of applying a polymerization activator to said first or second substrate.

In some embodiments, the first and second substrate may be of the same material or of different materials and are independently selected from the group consisting of: plant-based material, plastic, carbon-based material, metal, and glass-based material. In certain embodiments, the first and second substrate may be of the same material or of different materials and are independently selected from the group consisting of: paper, oak, Douglass fir, balsa, polyphenylene ether (PPE) plastic, polycarbonate (PC), silicon, glass, fiberglass, silver coated copper, copper, steel, polypropylene, biaxially oriented polypropylene, monoaxially oriented polypropylene, polyethylene, polyester, polyethylene terephthalate, biaxially oriented polyethylene terephthalate, and aluminum.

In other embodiments of the laminate preparation method, the method further comprises providing a polymerization activator in the form of a base, a base precursor, a base creator or a base enhancer within the polymerizable composition or on one of the substrates. In some embodiments, the polymerization activator is selected from an organic material, an inorganic material or an organo-metallic material, or a combination thereof. In other embodiments, the polymerization activator is at least one member selected from: sodium acetate; potassium acetate; acid salts of sodium, potassium, lithium, copper, and cobalt; tetrabutyl ammonium fluoride, chloride, and hydroxide; an amine whether primary, secondary or tertiary; an amide; salts of polymer bound acids; benzoate salts; 2,4-pentanedionate salts; sorbate salts; propionate salts; secondary aliphatic amines; piperidene, piperazine, N-methylpiperazine, dibutylamine, morpholine, diethylamine, pyridine, triethylamine, tripropylamine, triethylenediamine, N,N-dimethylpiperazine, butylamine, pentylamine, hexylamine, heptylamine, nonylamine, decylamine; salts of amines with organic monocarboxylic acids; piperidine acetate; metal salt of a lower monocarboxylic acid; copper(II) acetate, cupric acetate monohydrate, potassium acetate, zinc acetate, zinc chloracetate, magnesium chloracetate, magnesium acetate; salts of acid containing polymers; salts of polyacrylic acid co-polymers.

In other embodiments of the laminate preparation method, the method further comprises providing a formulation additive. In certain embodiments, the formulation additive is at least one member selected from: plasticizers, thixotropic agents, adhesion promoters, antioxidants, light stabilizers, UV stabilizers, fillers, surfactants, wetting agents, viscosity modifiers, extenders, dispersants, anti-blocking agents, defoamers, air release agents, anti-sagging agents, anti-setting agents, matting agents, flattening agents, waxes, anti-mar additives, anti-scratch additives, inert resins.

In another aspect, the invention provides a laminate article of manufacture prepared by the methods of the invention. In certain embodiments, the laminate article is a flexible laminate article. In other embodiments, the flexible laminate is a film or a packaging material.

In still other embodiments, the laminate article of manufacture further comprises at least one thermally sensitive material.

In another aspect, the invention provides a method for preparing a composite article comprising
a) providing a polymerizable composition comprising a di-activated vinyl compound, with the proviso that the di-activated vinyl compound is not a cyanoacrylate;
b) providing a reinforcing or filler material; and
c) providing a polymerization activator carried in the polymerizable composition or carried on the reinforcing material; and
d) molding the polymerizable composition and the reinforcing material.

In certain embodiments of the composite preparation method, d) is performed under temperature conditions less than 100 C. In other embodiments, d) is performed at ambient temperature.

In other embodiments of the composite preparation method, the polymerization activator is in the form of a base, a base precursor, a base creator or a base enhancer. In certain embodiments, the polymerization activator is selected from an organic material, an inorganic material or an organo-metallic material, or a combination thereof. In still other embodiments, the polymerization activator is at least one member selected from: sodium acetate; potassium acetate; acid salts of sodium, potassium, lithium, copper, and cobalt; tetrabutyl ammonium fluoride, chloride, and hydroxide; an amine whether primary, secondary or tertiary; an amide; salts of polymer bound acids; benzoate salts; 2,4-pentanedionate salts; sorbate salts; propionate salts; secondary aliphatic amines; piperidene, piperazine, N-methylpiperazine, dibutylamine, morpholine, diethylamine, pyridine, triethylamine, tripropylamine, triethylenediamine, N,N-dimethylpiperazine, butylamine, pentylamine, hexylamine, heptylamine, nonylamine, decylamine; salts of amines with organic monocarboxylic acids; piperidine acetate; metal salt of a lower monocarboxylic acid; copper(II) acetate, cupric acetate monohydrate, potassium acetate, zinc acetate, zinc chloracetate, magnesium chloracetate, magnesium acetate; salts of acid containing polymers; salts of polyacrylic acid co-polymers.

In other embodiments of the composite preparation method, further comprises adding a formulation additive. In certain embodiments, the formulation additive is at least one member selected from: plasticizers, thixotropic agents, adhesion promoters, antioxidants, light stabilizers, UV stabilizers, fillers, surfactants, wetting agents, viscosity modifiers, extenders, dispersants, anti-blocking agents, defoamers, air release agents, anti-sagging agents, anti-setting agents, matting agents, flattening agents, waxes, anti-mar additives, anti-scratch additives, inert resins.

In certain embodiments, the articles of manufacture of the invention comprise a flexible composite article. In other embodiments, the flexible composite article is a film, a packaging component, a construction material.

In certain embodiments, the articles of manufacture of the invention comprise a rigid composite article. In other embodiments, the rigid composite is a structural article, a furniture article, an aerospace component, a building article, a construction article.

The purpose and advantages of the present invention will be set forth in and apparent from the description that follows. Additional advantages of the invention will be realized and attained by the methods and systems particularly pointed out in the written description and claims hereof, as well as from the appended drawings.

These and other embodiments are disclosed or are obvious from and encompassed by the following Detailed Description.

DESCRIPTION OF THE INVENTION

Definitions

Unless defined otherwise, all technical and scientific terms used herein have the meaning commonly understood by a person skilled in the art to which this invention belongs. The following references provide one of skill with a general definition of many of the terms used in this invention: Singleton et al., Dictionary of Microbiology and Molecular Biology (2nd ed. 1994); The Cambridge Dictionary of Science and Technology (Walker ed., 1988); The Glossary of Genetics, 5th Ed., R. Rieger et al. (eds.), Springer Verlag (1991); and Hale & Marham, The Harper Collins Dictionary of Biology (1991). As used herein, the following terms have the meanings ascribed to them below, unless specified otherwise.

As used herein, the term "methylene malonate" refers to a compound having the core formula —O—C(O)—C(=CH$_2$)—C(O)—O—. Diethyl methylene malonate monomer is a methylene malonate having two ethyl groups and is denoted DEMM herein. Dimethyl methylene malonate monomer has two methyl end groups and is denoted DMMM or D3M herein.

As used herein, the term "methylene beta-ketoester" or "methylene β-ketoester", refers to a compound having the core formula —C(O)—C(=CH$_2$)—C(O)O—.

As used herein, the term "methylene beta-diketone" or "methylene β-diketone" refers to a compound having the core formula —C(O)—C(=CH$_2$)—C(O)—.

As used herein, the term "polymerizable composition" refers to a monomeric, oligomeric, or polymeric composition or mixture comprising molecules that are able to be polymerized by chain extension, cross-linking, or both.

As used herein, the term "monofunctional" refers to an addition monomer, for example a methylene malonate, having only one addition polymerizable group.

As used herein, the term "difunctional" refers to an addition polymerizable function containing monomer, oligomer, resin or polymer, with two such addition polymerizable groups, such as two methylene malonate groups, enabling crosslinking functionality.

As used herein, the term "multifunctional" refers to an addition polymerizable function containing monomer, oligomer, resin or polymer, with three or more such addition polymerizable groups, such as three or more methylene malonate groups. Thus "difunctional" is a specific example of "multifunctional."

As used herein, the term "activating agent precursor" refers to any agent that is limited in its ability to initiate polymerization, but which is capable of direct or indirect transformation into an activating agent as disclosed herein.

As used herein, the term "inactivate engagement" means that the activating agent is incapable of "activating" or "initiating" the polymerization of the polymerizable composition. An inactivating engagement may be achieved by any suitable means, including by physical separation of the activating agent from the polymerizable composition, or by providing the activating agent in a precursor form that is incapable of activating polymerization until the precursor form is converted to the activating agent, e.g., by administering an effective amount of ultraviolet illumination or radiation.

As used herein, the term "polymerizable system" or "formulated system" refers to a polymerizable composition and a suitable activating agent in combination, with or without other formulation additives.

As used herein, the term "formulation additives" refers to additives included in a formulated system to enhance physical or chemical properties thereof and to provide a desired result. Such formulation additives include, but are not limited to, dyes, pigments, toughening agents, impact modifiers, rheology modifiers, plasticizing agents, thixotropic agents, natural or synthetic rubbers, filler agents, reinforcing agents, thickening agents, opacifiers, inhibitors, fluorescence markers, thermal degradation reducers, thermal resistance conferring agents, surfactants, wetting agents, stabilizers.

As used herein the term "composites" refers to materials in which a matrix component is reinforced by a typically, but not always, stronger and stiffer reinforcing constituent. In some instances, the composite may include fillers instead of, or in addition to the reinforcing constituent. The reinforcing constituent in some instances may be fibrous, though the term is not so limited. The reinforcing constituent may have a particular form or shape as desired. Reinforcing constituents may be oriented into specific patterns, or randomly oriented along any of the component's axes and may be any size as desired. For example, the term "FRP" or "Fiber Reinforced Plastic" usually indicates a thermosetting polyester matrix containing glass fibers. As mentioned above, OSB is a wood flake based composite bound with a polymer resin. An asphalt driveway is a composite of particulate rocks and a bitumen matrix. A solid surface counter top may be a composite of mineral reinforcement and a resin matrix. Thus, the term "composite" as used herein should be considered as broadly encompassing these and other applications.

As used herein, the term "di-activated vinyl compound" refers to a molecule having at least one group having a di-activated vinyl group represented by -EWG-C(=CH$_2$)-EWG-; where EWG is an electron withdrawing group, other than a cyanoacrylate.

As used herein the term "base" refers to a component having at least one electronegative group capable of initiating anionic polymerization.

As used herein the term "base precursor" refers to a component that may be converted to a base upon being acted upon in some manner, e.g., application of heat, chemical reaction, or UV activation.

As used herein the term "base converters" refers to an agent that is capable of acting in some manner to generate or convert another component into an active base.

As used herein, the term "base enhancer" refers to an agent that is capable of acting in some manner to improve or enhance the basicity of an agent.

Unless otherwise identified, all percentages (%) are "percent by weight." For the composite and laminate examples provided below, weight percentages represent "pre-cure" weights unless indicated otherwise.

Thermal Analysis

For TGA thermal analysis, all experiments were performed using a TA Q50 TGA. TGA stands for thermal gravimetric analysis. It is a very sensitive instrument that measures how weight changes as a sample is heated. For these experiments, samples were heated at a rate of 10 C/min to 600 C in nitrogen until 500 C. At 500 C the instrument switched over to air to help burn off more material. The data collected was then plotted as weight percent over temperature and the temperature at 5% mass loss was recorded. This temperature is considered the decomposition temperate (Td5%).

For DSC thermal analysis on polymer samples, all experiments were performed using a TA Q2000 DSC with a RCS 90 cooling system. DSC stands for differential scanning calorimetry and it measures the amount of heat it takes to raise the temperature of a reference and a sample at the same rate. Then comparing the sample and reference heat flows, one can see the sample's phase changes by the energy released or required. For these experiments, samples were heated at 10 C/min to just below their decomposition temperature (as determined by TGA), then cooled at 20 C/min to −60 C, and then heated again to just below the decomposition temperature. The first heat is required to erase the materials thermal history and the second heat is the one used to determine thermal properties such as glass transition temperature (Tg), crystallization temperature (Tc), and melting point (Tm).

Exemplary Embodiments

Exemplary embodiments disclosed herein relate to compositions, articles, and methods for producing novel composites and laminates based on polymerizable mono-functional and/or multifunctional monomers, oligomers and polymers, and other compositions as provided herein, and to their application.

Exemplary embodiments disclosed herein provide novel and nonobvious improvements in the use of polymerizable compositions (e.g., monomers, oligomers, and/or polymers). Of particular interest are compositions such as, but not limited to, di-activated vinyl compounds such as methylene malonates, methylene β-ketoesters, methylene β-diketones, dialkyl disubstituted vinyl, dihaloalkyl disubstituted vinyl, whether monofunctional, difunctional, or multifunctional.

Exemplary embodiments provide polymerizable systems including the polymerizable composition with an activation or initiation mechanism. For example, the polymerizable composition may be anionically initiated by a basic agent. Polymerization of other exemplary embodiments may be initiated through free-radical mechanisms. In other embodiments, the activating agent may be inherent in or added to the filler substrate.

Various activation methods may be used, including an already basic surface on the reinforcing materials or filler. Other activation methods include the release of catalytic amounts of encapsulated bases, base precursors or base creators via energy exposure to facilitate polymerization. Other contemplated activation methods include the application of a base, base precursor, or base creator through a physical dispensation method (e.g., through a syringe, spray mechanism, and the like).

Certain of the polymerizable compositions disclosed herein polymerize anionically and thus are not significantly impacted by the presence of air or atmospheric moisture. Instead, they may cure quickly upon contact with bases. The bases may be initially provided as base precursors or base creators and converted in some manner to an active base form. In exemplary embodiments, only catalytic amounts are required and the materials can be native, pre-applied, or applied as required.

Exemplary embodiments disclosed herein provide polymerizable systems useful to form the polymeric matrix material in composite articles.

Exemplary embodiments disclosed herein provide composite articles including a variety of reinforcing material dispersed in a polymeric matrix.

Exemplary embodiments disclosed herein provide polymerizable systems useful to adhere layers of a laminate structure.

Exemplary embodiments disclosed herein provide polymerizable systems useful to form layers of a laminate structure.

Exemplary embodiments disclosed herein include composite materials, including adhesives, comprising polymeric material formed from di-activated vinyl compounds such as methylene malonates, methylene ☐eta-ketoesters, methylene beta-diketones, dialkyl disubstituted vinyl, dihaloalkyl disubstituted vinyl, whether monofunctional, difunctional, or multifunctional, monomers, oligomers and/or polymers.

Exemplary embodiments disclosed herein include laminate structures comprising polymeric material formed from methylene malonates, methylene ☐eta-ketoesters, methylene beta-diketones, dialkyl disubstituted vinyl, dihaloalkyl disubstituted vinyl, whether monofunctional, difunctional, or multifunctional, monomers, oligomers and/or polymers.

Exemplary embodiments disclosed herein provide means for the commercial reduction to practice of a low or zero energy input, very fast polymerizing addition and/or cross-linking polymer platform.

Exemplary embodiments disclosed herein provide a polymer platform and polymerizable systems with far ranging property sets.

Exemplary embodiments disclosed herein provide cross-linkable systems.

Exemplary embodiments disclosed herein provide polymerizable systems made either in whole or in part made from a broad sustainable resource base, including sugars, atmospheric gases, waste gases and synthesis gas.

Exemplary embodiments disclosed herein provide binder systems for a myriad of composite types, including fiber reinforced, aggregate or particle reinforced and/or laminar reinforced composites.

Exemplary embodiments disclosed herein can be applied as a 100% solids reactive composition able to cure, if desired, nearly instantaneously, on contact after wetting the reinforcing material.

Certain exemplary embodiments can cure with no or low energy input.

Exemplary embodiments disclosed herein eliminate the need for two part condensation polymerization or addition polymerization systems where complex, precise mixing and metering systems are required. Further, such systems eliminate the need for sophisticated ovens to supply the heat necessary for full cure of prior systems. Still further, such systems eliminate the need to control volatilization of solvents.

Exemplary embodiments disclosed herein require less than about 2% by weight catalyst, or more preferably, less than about 1% by weight catalyst, to dramatically reduce leaching of non-bound chemical elements.

Exemplary embodiments disclosed herein provide for more facile activation without the need for substantial mixing in stoichiometric ratios.

Exemplary embodiments disclosed herein provide low temperature curing allowing for the use of materials that would otherwise not survive a typical high heat/pressure cure process in prior known systems.

Exemplary embodiments disclosed herein are directed to systems that offer high thermal resistance without the need for elevated curing.

Exemplary embodiments disclosed herein do not require special storage (e.g., refrigeration) or handling protocols.

The exemplary materials disclosed herein can cure over a broad range of environments.

Exemplary embodiments disclosed herein can be designed to exhibit physical properties over a broad range.

The following examples are provided as proof of concept and are exemplary in nature, and not intended as limiting the invention disclosed herein.

Composites

Various proof of concept ideas were tested in the field of composites. Exemplary embodiments are provided below.

Fiberglass Composites

The fiberglass material used during testing was 2.5 oz fiberglass cloth. The final composite product was intended to be a composite mat of the fiberglass cloth material.

The fiberglass cloth was first cut and prepared into squares of two inches by two inches in size. These layers were laid out individually on the lab bench to prepare for lay-up and bonding. The initiator used for adhesive bonding was a solution of 3% by weight 1,8-Diazabicycloundec-7-ene (DBU) in Acetone. This initiator is merely exemplary, and other anionic and free-radical initiators may be utilized in the practice of the invention. In the exemplary embodiment, the polymerizable composition was Diethyl Methylene Malonate (DEMM) (about 99% pure). This polymerizable composition is merely exemplary and other methylene malonates and chemically related components may be utilized as well in the practice of the invention.

Methodology:

Using a 3 mL dropper, half of the fiberglass sheets were saturated with the initiator solution, and the remaining half of the fiberglass sheets were saturated with the DEMM. The fiberglass mat composite was then prepared by layering the individual squares of the fiberglass material. The order of layering involved an alternating system, where the sandwich structure of fiberglass material was comprised of a layer of fiberglass saturated with the initiator followed by a layer saturated with the DEMM, which was then followed by a layer saturated with the initiator, and so on. In an exemplary embodiment, a total of eight fiberglass sheets were utilized. A rubber roller was used to compress the composite sandwich after all the layers had been put in place.

Results and Observations:

During the curing process, a small amount of heat was exhibited from the composite product. The cure speed was very rapid and a solid composite structure that could be handled was produced within roughly 2 minutes. After the initial cure, the sample was conditioned for 24 hours resulting in a rigid fiberglass composite structure. It should be noted that this composite structure was formed on a lab bench, without application of heat or a substantial amount of pressure. Alternate methods of attaining an activated surface on some or all of the fiberglass layers or glass fibers can be provided. For example, the fiberglass can be sized or otherwise pretreated with an initiator or initiator precursor in a separate operation and brought into contact with the polymerizable to permit "on-demand" polymerization. In this and other exemplary embodiments, additional exemplary initiators of interest include sodium hydroxide, potassium hydroxide, potassium sorbate, sodium acetate, and tertiary butyl ammonium fluoride.

Carbon Fiber Composites

Carbon fiber composites were prepared in a manner similar to that presented above with respect to fiberglass composites. The carbon fiber material used during testing was woven carbon fiber cloth. The final composite product was intended to be a composite mat of the carbon fiber cloth material.

Methodology:

The carbon fiber cloth was first cut and prepared into squares of two inches by two inches in size. These layers were laid out individually on the lab bench to prepare for bonding. The initiator used for adhesive bonding was a solution of 3% by weight 1,8-Diazabicycloundec-7-ene (DBU) in Acetone. The polymerizable composition used for composite preparation was 99% pure Diethyl Methylene Malonate (DEMM).

Using a 3 mL dropper, half of the carbon fiber sheets were saturated with the initiator solution, and the remaining half of the carbon fiber sheets were saturated with the DEMM. The carbon fiber mat composite was then prepared by layering the individual squares of the carbon fiber material. The order of layering involved an alternating system, where the sandwich of carbon fiber material was comprised of a layer of carbon fiber saturated with the initiator followed by a layer saturated with the DEMM, which was then followed by a layer saturated with the initiator, and so on. A total of eight squares were layered together. A rubber roller was used to compress the composite sandwich after all the layers had been put in place.

Results and Observations:

During the curing process, a small amount of heat was exhibited from the composite product. The cure speed was very rapid producing a composite structure that can be handled within roughly 2 minutes. After the initial cure, the sample was conditioned for 24 hours resulting in a rigid carbon fiber composite.

Wood Composites

Wood composite articles were prepared according to the following methodology. The final composite product was intended to be a three-dimensional composite structure having wood particles carried in a polymeric matrix. The material used in the wood composites was a loose, granular wooden material with a consistency slightly greater than sawdust.

Methodology:

The wood chips were placed in a vial containing a solution of 3% by weight DBU in Acetone so that the material could be evenly saturated with the initiator solution. The woodchips were then placed in an aluminum weighing dish and spread to form an even layer. Using a 3 mL dropper DEMM was then added to the wood chips in an attempt to fully saturate the wood chips in the dish.

Results and Observations:

Upon adding the DEMM to the aluminum dish, the primer initiated a very rapid reaction that produced smoke and a strong exotherm. Curing happens very quickly, and the resulting product can be handled within 2 minutes. After the initial cure, the sample was conditioned for 24 hours resulting in a rigid wood particulate composite.

Aluminum Oxide Composites:

A composite material was formed using pure aluminum oxide in combination with DEMM.

Methodology:

Aluminum oxide in powder form was placed into an aluminum weighing dish and spread out to form a uniform layer. Then, using a 3 mL dropper, DEMM was added to the aluminum dish in an attempt to saturate the powder material.

Results and Observations:

The aluminum oxide/DEMM cured without the use of any added primer or initiator, resulting in a fully cured composite within 15 minutes to produce a solid, rigid, and impact resistant white disk.

The proof of concept studies for composite structures indicates that DEMM and other chemically related compounds are amenable to forming polymeric matrices in the composite structures. Suitable formulation additives may be used to tailor the physical properties of the composite structures in order to meet desired specifications. It is envisioned that similar results will be found for other methylene malonates, methylene □eta-ketoesters, methylene beta-diketones, dialkyl disubstituted vinyl, dihaloalkyl disubstituted vinyl, whether monofunctional, difunctional, or multifunctional.

Additional composite examples are provided below. In some instances, a blend of a multifunctional monomer in DEMM was utilized as the polymerizable composition. Multifunctional monomers (including difunctional monomers) and polymerizable compositions are disclosed in co-pending patent application PCT/US12/60830 entitled Multifunctional Monomers, Methods For Making Multifunctional Monomers, Polymerizable Compositions And Products Formed Therefrom, incorporated herein in its entirety. In an exemplary embodiment, the multifunctional monomer is obtained by the transesterification of diethyl methylene malonate (DEMM) and 1,6-hexanediol (HD):

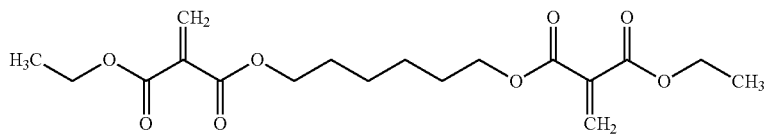 [SMILES: C=C(C(=O)OCC)C(=O)OCCCCCCOC(=O)C(=C)C(=O)OCC]

referenced herein as "Multifunctional (DEMM/HD) product".

Multifunctional (DEMM/HD) product as cited in the examples below is provided for exemplary purposes only and not by way of limitation. It is anticipated that other multifunctional methylene monomers as disclosed in the co-pending patent application can be utilized to form composites according to the principles disclosed herein.

An exemplary polymerizable composition includes: approximately 85% by weight DEMM, approximately 10% by weight Multifunctional (DEMM/HD) product, and approximately 5% by weight other (including diethyl malonate (DEM)), referenced herein as "Multifunctional Blend."

Alumina/Multifunctional Composite with Additional Stabilizer: KK030.136.FM1

The objective of this experiment was to form a composite by curing a polymerizable composition of Multifunctional Blend (overstabilized with 500 ppm MSA) with approximately 60% by weight alumina (pre-cure weight).

The starting materials were: Multifunctional Blend; 10000 ppm methane sulfonic acid (MSA) in DEMM as stabilizer); Alumina (Admatechs high purity alumina, 99.9+%, size=0.7 um, specific surface area=6.0 m2/g, surface pH=5.3, product #AO-802 (lot #PWG112), provided in the amounts set forth in Table 1.

Procedure:

TABLE 1

| KK030.136.FM1 | | |
|---|---|---|
| Reagent | Target Mass, g | Actual Mass, g |
| 10000 ppm MSA in DEMM | 0.6 | 0.608 |
| Multifunctional Blend | 11.4 | 11.39 |
| Alumina, acidic | 18 | 18.012 |

The multifunctional blend and 10000 ppm MSA in DEMM stock solution were combined in a 100 ml polypropylene tripour, mixed with an overhead mechanical stirrer equipped with a 1" dispersion blade at 250 RPM. Next, alumina powder was slowly added over 10 minutes, increasing the stir rate as viscosity began to build. After 28 minutes of mixing at a shear rate of 2500 RPM, the solution began to exotherm slightly and the mixture was transferred to an aluminum weigh pan to cure.

Thermal analysis of the composite yielded: Td5% in $N_2$: 293 C; Td5% in air: 261 C; Tg: 14 C.

Alumina/Silica/Multifunctional Composite: KK030.137.FM1

The objective of this experiment was to form a composite by curing a polymerizable composition of an Multifunctional Blend, with approximately 40% by weight alumina, 20% by weight silica, (pre-cure weights) without the use of additional stabilizer.

The starting materials were Multifunctional Blend; silica (Admatechs methacryl surface functionalized silica, 99.0+%, size=10 nm, specific surface area=300 m2/g, surface pH=5.0-7.0, product #YA010C-SM1 (lot #VWL170-124)); alumina (Admatechs high purity alumina, 99.9+%, size=0.7 um, specific surface area=6.0 m2/g, surface pH=5.3, product #AO-802 (lot #PWG112)), in the amounts set forth in Table 2.

Procedure:

TABLE 2

| KK030.137.FM1 | | |
|---|---|---|
| Reagent | Target Mass, g | Actual Mass, g |
| Multifunctional Blend | 16 | 16.008 |
| Silica, acidic | 16 | 16.036 |
| Alumina, acidic | 8 | 8.042 |

The Multifunctional Blend was massed in a 100 ml polypropylene tripour. An IKA RW-20 mixer equipped with a 1" dispersion blade was used to mix the monomer at 250 RPM. Slowly, silica was added under low shear (350 RPM). After about 15 minutes, all silica was incorporated and the solution appeared to be stable. Next, alumina powder was slowly added over an hour, increasing the stir rate as viscosity began to build. Once homogenous, the mixture was transferred to an aluminum weigh pan to cure.

Thermal analysis of the composite yielded: Td5% in $N_2$: 265 C; 261 C; Tg: 3.7 C.

Saw Dust/Multifunctional Blend Composite: KK030.138.FM1

The objective of this experiment was to form a composite by curing a polymerizable composition of a approximately 60% Multifunctional Blend with 40% saw dust.

The starting materials were Multifunctional Blend; Saw dust (combination of soft maple, white oak, and cherry, pH=5.7); 1% potassium benzoate in ethanol, activator; Release agent (Superior Nanowax by Eagle One made of water, carnuba wax, ethylene glycol) in the amounts set forth in Table 3.

Procedure:

TABLE 3

| KK030.138.FM1 | | |
|---|---|---|
| Reagent | Target Mass, g | Actual Mass, g |
| Multifunctional Blend | 12.0 | 11.988 |
| saw dust | 8.0 | 8.034 |
| sodium benzoate/ethanol | 1.0 | ~2.0 |

The Multifunctional Blend was massed in a 100 ml polypropylene tripour. An IKA RW-20 mixer equipped with a 1" dispersion blade was used to mix the monomer at 250 RPM. Slowly, saw dust was added under low shear (350 RPM) until a paste consistency was reached. The mechanical stirrer was removed and the remainder of the saw dust was blended by hand. Next, potassium benzoate solution was added dropwise and blended by hand until a mild exotherm was detected. The mixture was transferred to a piece of aluminum foil pre-coated with release agent and compressed in a manual press to 0.25" thickness. After 30 minutes, the composite was removed from the press and allowed to cure overnight.

Thermal analysis of the composite yielded: Td5% in $N_2$: 148 C; Td5% (sawdust) in $N_2$: 201 C; Tg: −25 C.

Sand/DEMM Composite: KK030.139.FM2

The objective of this experiment was to form a composite by curing a polymerizable composition of approximately 33% DEMM with 67% acid-washed sand.

The starting materials were DEMM (approximately 96% pure); acid washed sand (Alfa Aesar, lot #10172008); 0.5% proprietary glucarate in water as activator in the amounts provided in Table 4.

Procedure:

TABLE 4

KK030.139.FM2

| Reagent | Target Mass, g | Actual Mass, g |
|---|---|---|
| DEMM | 2.5 | 2.520 |
| Sand (acid washed) | 10.0 | 10.035 |
| Activator | 2.0 | 2.021 |

The sand was massed in an aluminum weigh pan. The activator solution was added to the sand and stirred by hand. The pan was placed in 121 C oven for 1 hour to evaporate the water. DEMM was slowly added drop wise to cover the entire sand surface and set aside to cure.

Thermal analysis of the composite yielded: Td5% in N2: 266 C; Tg: 28 C.

Acrylonitrile Butadiene Styrene (ABS)/DEMM Composite: KK030.141.FM2

The objective of this experiment was to form a composite by curing a polymerizable composition of approximately 88.3% DEMM with 11.7% ABS shavings, and to determine if the DEMM would polymerize without additional activator.

The starting materials were DEMM (approximately 96% pure) and ABS shavings in the amounts provided in Table 5.

Procedure:

TABLE 5

KK030.141.FM2

| Reagent | Target Mass, g | Actual Mass, g |
|---|---|---|
| DEMM | 2.500 | 2.563 |
| ABS | 0.350 | 10.035 |

The ABS shavings were creating by scraping a knife across a piece of ABS. The shavings were massed in an aluminum weigh pan. DEMM was added drop wise to cover all of the shavings and set aside to cure. The entire mixture solidified within 1 hour.

Thermal analysis of the composite yielded: Td5% in $N_2$: 226 C; Tg: 22 C; whereas thermal analysis performed on ABS yielded: Td5% in $N_2$ (ABS): 340 C; Tg (ABS): 110 C.

Alumina/DEMM Composite: KK030.141.FM3

An objective of this experiment was to make a composite using 60% alumina and 40% DEMM, then compare to a similar composite made with Alumina/Multifunctional Blend.

The starting materials were DEMM (96% pure); 10000 ppm MSA in DEMM; Alumina (Admatechs high purity alumina, 99.9+%, size=0.7 um, specific surface area=6.0 m2/g, surface pH=5.3, product #AO-802 (lot #PWG112)) in the amounts provided in Table 6.

Procedure:

TABLE 6

KK030.141.FM3

| Reagent | Target Mass, g | Actual Mass, g |
|---|---|---|
| 10000 ppm MSA in DEMM | 1.2 | 1.211 |
| DEMM | 10.8 | 10.806 |
| Alumina | 18 | 18.019 |

The DEMM and 10000 ppm MSA in DEMM stock solution were combined in a 100 ml polypropylene tripour, mixed with an overhead mechanical stirrer equipped with a 1" dispersion blade at 250 RPM. Next, alumina powder was slowly added over 10 minutes, increasing the stir rate as viscosity began to build. After 10 minutes of mixing at a shear rate of 2500 RPM, the solution began to exotherm and the mixture was transferred to an aluminum weigh pan to cure.

Thermal analysis of the composite yielded: Td5% in $N_2$: 283 C; Tg: 24 C.

Pine Shavings/DEMM Composite: KK030.142.FM1

An objective of this experiment was to make a composite using pine wood shavings (25%) and DEMM (75%).

The starting materials were DEMM (approximately 95% pure), 1% DBU in acetone, and pine wood shavings in the amounts provided in Table 7.

Procedure:

TABLE 7

KK030.142.FM1

| Reagent | Target Mass, g | Actual Mass, g |
|---|---|---|
| DEMM | 3.0 | 1.363 |
| DBU/acetone | 1.0 | 0.965 |
| pine shavings | 1.0 | 1.001 |

The wood shavings and DBU/acetone mixture were combined in an aluminum weigh pan. Additional acetone was utilized to saturate the wood shavings. The weigh pan was placed in an 82 C oven for 1 hour to evaporate. The wood chips were placed in a uniform layer on the bottom of the weight pan. Carefully DEMM was added drop wise to the wood chips. After all of the wood was covered, the pieces were compressed and allowed to fully cure.

Thermal analysis of the composite yielded: Td5% in $N_2$: 203 C; whereas thermal analysis on pine shavings only yielded: Td5% in $N_2$: 157 C; Tg: 31 C.

Wood Flour/DEMM Composite: KK030.142.FM2

An objective of this experiment was to make a composite using wood flour (31%) and DEMM (69%).

The starting materials were DEMM (95% pure); 1% DBU in acetone, and wood flour obtained from System Three Resins, Inc., in the amounts shown in Table 8.

Procedure:

TABLE 8

KK030.142.FM2

| Reagent | Target Mass, g | Actual Mass, g |
|---|---|---|
| DEMM | 6.0 | 5.409 |
| DBU/acetone | 1.0 | 0.988 |
| Wood Flour | 2.5 | 2.501 |

The wood flour and DBU/acetone mixture were combined in an aluminum weigh pan. Additional acetone was utilized to saturate the wood flour. The weigh pan was placed in an 82 C oven for 1 hour to evaporate. The wood flour was placed in a uniform layer on the bottom of the weight pan. Carefully DEMM was added drop wise to the wood flour. After all of the wood was covered, the pieces were compressed and allowed to fully cure.

Thermal analysis of the composite yielded: Td5% in $N_2$: 238 C; Tg: 27 C; whereas thermal analysis of the wood flour only yielded: Td5% in $N_2$: 211 C Polycarbonate/DEMM Composite: KK030.143.FM1

An objective of this experiment was to create a polycarbonate/DEMM composite without adding additional activator.

The starting materials were DEMM (95% pure) and Makrolon sheet polycarbonate provided in the amounts set forth below in Table 9.

Procedure:

TABLE 9

| KK030.143FM1 | | |
|---|---|---|
| Reagent | Target Mass, g | Actual Mass, g |
| DEMM | 2.5 | 2.550 |
| Makrolon | 0.3 | 0.311 |

The polycarbonate shavings were creating by scraping a knife across a sheet piece of polycarbonate. The shavings were massed in an aluminum weigh pan. DEMM was added drop wise to cover all of the shavings and set aside to cure. The entire mixture solidified within 1 hour.

Thermal analysis of the composite yielded: Td5% in $N_2$: 234 C; Tg: 24 C; whereas thermal analysis of PC only yielded: Td5% in $N_2$(PC): 440 C; Tg (PC): 150 C.

Other composites are disclosed herein made using DEMM & woven filler materials from Jamestown Distributors. The filler materials include: fiberglass (mat, cloth, veil mat, texalium cloth, biaxial cloth), carbon (plain weave, 2×2 twill weave, unidirectional, hybrid with Kevlar), Kevlar (plain weave, 3×2 twill weave, hybrid with carbon), release fabric, Si wafer, Kapton® polyimide film by DuPont™. The activators include: 1 N KOH in methanol, 0.1% 1,1,3,3-tetramethylguanidine in ethanol or acetone, 3-aminopropyl triethoxysilane. Unless otherwise specified, the samples were allowed to cure at ambient temperature.

Barracuda Fabric/DEMM: KK030.144.FM1

Procedure:

TABLE 10

| KK030.144.FM1 | |
|---|---|
| Reagent | Actual Mass, g |
| DEMM (95% purity) | 0.108 |
| Barracuda Fabric | 0.065 |

The Barracuda® (aluminized fiberglass) fabric, BGF2510×50 (#65691), was cut into a small square piece and saturated with DEMM. DEMM fully cured within 4 hours.

Barracuda Fabric/Multifunctional Blend KK030.144.FM2

Procedure:

TABLE 11

| KK030.144.FM2 | |
|---|---|
| Reagent | Actual Mass, g |
| Multifunctional Blend w/100 ppm MSA | 0.096 |
| Barracuda Fabric | 0.054 |

The Barracuda fabric, BGF2510×50 (#65691), was cut into a small square piece and saturated with the Multifunctional Blend. The polymerizable composition did not cure after 72 hours, likely due to the extra acid stabilizer (100 ppm MSA).

Veil Mat/DEMM: KK030.144.FM3

Procedure:

TABLE 12

| KK030.144.FM3 | |
|---|---|
| Reagent | Actual Mass, g |
| DEMM (95% purity) | 0.163 |
| Veil Mat | 0.013 |

The Veil Mat, 0.09 oz./yd. (#53498), was cut into a small square piece and saturated with DEMM. DEMM fully cured within 1 hour.

Fiberglass Mat/DEMM: KK030.145.FM1

Procedure:

TABLE 13

| KK030.145.FM1 | |
|---|---|
| Reagent | Actual Mass, g |
| DEMM (95% purity) | 0.697 |
| Fiberglass Mat | 0.270 |

The Fiberglass Mat, 2.0 oz. (#53525), was cut into a small square piece and saturated with DEMM. DEMM fully cured within 4 hours.

Biaxial Cloth/DEMM: KK030.145.FM3

Procedure:

TABLE 14

| KK030.145.FM3 | |
|---|---|
| Reagent | Actual Mass, g |
| DEMM (95% purity) | 0.841 |
| Biaxial Cloth | 0.506 |

The Biaxial Cloth, 17.0 oz. (#15035), was cut into a small square piece and saturated with DEMM. DEMM fully cured within 4 hours.

Release Fabric/DEMM: KK030.145.FM13

Procedure:

TABLE 15

| KK030.145.FM13 | |
|---|---|
| Reagent | Actual Mass, g |
| DEMM (95% purity) | 0.175 |
| Release Fabric | 0.052 |

The Release Fabric, (#37895), was cut into a small square piece and saturated with DEMM. DEMM fully cured within 8 hours.

Carbon Fiber Cloth/DEMM: KK030.147.FM3
Procedure:

The carbon fiber cloth, (#5374), was cut into a small square piece and saturated with a 1% LICA (Ken-React® LICA® 44 Titanate Coupling Agent) in ethanol solution and then placed in 121 C oven for 10 minutes. The cloth was cooled and then saturated with DEMM (95% purity). DEMM fully cured within 8 hours.

Polypropylene Felt/DEMM: KK030.147.FM5
Procedure:

Polypropylene felt, 1/16" thickness (Buffalo Felt Products Corp, MS-29710790), was cut into a small square piece and saturated with 0.1% 1,1,3,3 tetra methyl guanidine (TMG) in ethanol and then placed in 121 C oven for 10 minutes. The felt was cooled and then saturated with DEMM (95% purity). DEMM did not cure under ambient conditions.

Fumed silica/DEMM: KK030.147.FM6
Procedure:

The silica (Cabot TS-720 (lot #3273445)) was placed in an aluminum pan and saturated with 0.25% TMG solution and then placed in 121 C oven for 20 minutes. The silica was cooled and then saturated with DEMM (95% purity). Cure occurred within minutes.

Kevlar/DEMM: KK030.147.FM7
Procedure:

The Kevlar (5 oz., plain weave, (#4201)) was placed in an aluminum pan and etched with 1.0 N KOH in methanol solution for 10 minutes. The cloth was rinsed three times with deionized water, then placed in the 121 C oven for 15 minutes. DEMM (95% purity) was added drop wise to saturate the Kevlar film. Cure occurred within hours.

Table 16 provides a partial listing of composite industries and products. Many of the current state of the art composites can be improved by application of the principles taught herein, specifically by use of the polymerizable compositions disclosed herein as the polymeric matrices. The polymerizable compositions taught herein can be designed for near instantaneous, or if desired longer, tailored, cure rates. Exemplary polymerizable compositions do not use styrene, high catalyst loading, high temperature cures, or other difficulties encountered in the composites industry. Additionally in some applications improvements can be made because fillers that are thermally sensitive, and thus not available for use in systems requiring high temperature cure, can be used in the polymerizable compositions disclosed herein.

Thus, as set forth herein a variety of materials and forms may be utilized for composite fillers. A partial listing includes particulates, glass, fibers (short, long, chopped, uni-directional, bi-directional), fabric (woven, non-woven), nano particles, carbon, clay, sand, rock, wood, rubber, and plastics.

The polymeric matrix can include polymerizable compositions as disclosed herein including with co-reacting or carrier resins.

Exemplary embodiments disclosed herein include laminar structures as well as bulk polymerized material.

Of particular interest is high performance composite materials for use, for example, in the automotive, aerospace, wind turbine, and sporting goods industries. Composites disclosed herein provide significant opportunities for energy savings (ambient curing polymer matrices), and light-weighting of products. Thus exemplary embodiments can be utilized to form an automotive component, an architectural component, a sporting goods component, a friction industry component, a high performance composite component, a dental component, a building component, a furniture component, a marine component, an aerospace component.

TABLE 16

Composite Industries and Products

| Composite Type | Current State of the Art | Uses |
| --- | --- | --- |
| Fiberglass | Typically unsaturated polyester in styrene and glass fiber or cloth and often other fillers such as talc. Free radical cure with either benzoyl peroxide or other peroxide or per-oxy compounds (MEQ peroxide is common) | Used in many industries including bathroom fixtures, boats, personal watercraft, automotive parts, skis, hockey sticks, tanks, surf boards, burial casks, and many others. Also used in construction materials (including drainage pipe); safety equipment, playground materials, flooring, musical instruments. |
| High Pressure Laminate | HPL - such as Formica or Wilsonart laminate | Building and construction |
| Aggregate constructions | "Artificial" granite, etc. for countertops, construction materials; even tombstones | Building and construction |
| SMC | Sheet Molding Compound Typically polyester resin, styrene, multiple peroxide initiators and other fillers. Is formed into partially cured sheets which are then B staged like a stamping made of metal in a heated press. | Automotive body panels. Over the road trucks and truck cabs, personal watercraft, construction materials, furniture, pipe (especially drainage) |
| High performance composites | Epoxy, phenolic resin and unsaturated polyester with glass fiber, carbon fiber, carbon nanotubes, carbon buckyballs, graphite, graphene and other reinforcing fillers. Can often include other inorganic and organic fibers and fillers to impart required | Aerospace, performance automobiles, high end sports equipment (hockey, tennis, skis, bicycle frames, motorcycles, military; musical instruments; flooring; building & construction, tools; sandwich panels; body & vehicle armor, etc. |

TABLE 16-continued

Composite Industries and Products

| Composite Type | Current State of the Art | Uses |
| --- | --- | --- |
| | properties (flame resistance, low smoke properties, thermal expansion properties, color, radar absorbing, etc.) | |
| Friction Industry (abrasives and brake components) | Composites using high temperature binders (usually phenol-formaldehyde or urea formaldehyde and sometimes epoxy resins) and high temperature inorganic fillers such as carbon materials (see above) and various high grit materials including silicates, graphites, etc.) | Brake shoes, brake pads (all sorts of vehicles and industrial equipment); abrasives - both BONDED abrasives (grinding wheels) and COATED abrasives (sandpaper, belts); anti-slip materials (stair treads, etc.) |
| Engineered Wood | Oriented Strand Board (OSB), particle board, plywood; etc. | Building and construction; furniture |
| Dental Composites | Dental restoration (low metal content); usually BIS-GMA and silica fillers; radiation cure | Dental fillings, etc. |
| Mastics | Portland cement type composites | Usually used around swimming pools. Can be made more flexible with modifiers |

Laminates

Certain polymerizable compositions were cast onto primed or unprimed substrates, bonded, then tested for cure and/or peel strength.

Methodology:

Three primers—Michem Flex P1852, Michem Flex P2300, and DigiPrime 4431 from Michelman (Cincinnati, Ohio)—were cast on three different substrates—biaxially oriented polypropylene (BOPP), polyethylene terephthalate (PET), and polycarbonate (PC)—using a #2.5 wire rod resulting in a 0.25 mil primer coat. The samples were then cured in a 100° C. oven for 60 seconds. Diethyl methylene malonate (DEMM) was then cast on top of the primer solutions using a #14 rod resulting in a 1 mil thick film. The coated samples were then placed adhesive side together and bonded in a Carver press at 50 psi for 60 seconds. One inch samples were cut and tested in a T-peel mode on a Thwing-Albert EJA series tester using a 25N load cell. Peel strength was tested over a distance of two inches. Peel results are tabulated below. Most of the failure modes were adhesive, but the polycarbonate (PC) samples exhibited substrate failure.

Results and Observations:

TABLE 17

Peel Strength Data for Exemplary Laminate Structures

| Substrate | Primer | Peel Strength (g/in) |
| --- | --- | --- |
| BOPP | Michem Flex P1852 | 99.8 |
| | Michem Flex P2300 | 93.9 |
| | DigiPrime 4431 | 85.9 |
| PET | Michem Flex P1852 | 62.8 |
| | Michem Flex P2300 | 2.9 |
| | DigiPrime 4431 | 6.4 |
| PC | Michem Flex P1852 | 505 |
| | Michem Flex P2300 | 438 |
| | DigiPrime 4431 | 124 |
| | No Primer | 428 |

This proof of concept study summarized in Table 17, shows that formulations can be made using DEMM to form an adhesive bond between layers of a laminate structure. Those having skill in the art will appreciate that using the principles disclosed herein, suitable combinations of substrate, primer and polymerizable material can be found to produce desired peel strength in laminate structures. Further, on PC substrate, the DEMM provided excellent peel strength results without additional primer.

Kapton Laminated on Si Wafer Using DEMM: KK030.146.FM1

Another laminate structure was made with Kapton film laminated onto a Silicon wafer using DEMM (99% purity). 1% 3-aminopropyl triethoxysilane in ethanol was utilized as a surface coupling agent. 1.0 1.0 N KOH in methanol, Alfa Aesar, lot #H29Y020

Procedure:

The Kapton film was immersed into a 1.0 N solution of KOH in methanol to be etched for 10 minutes. The film was rinsed three times with ethanol. Next, a layer of 1% 3-aminopropyl triethoxysilame in ethanol was drawn down on both the Kapton and Si wafer using a #10 Myer Rod. The Film and wafer were placed in a 121 C oven for 10 minutes. After the film and wafer were removed from the oven to cool then, a few drops of DEMM were applied to the wafer and the Kapton film was placed firmly on top and held for 5 seconds. Reasonable adhesion between the film and wafer was observed.

Table 18 provides examples of other laminate structures. The examples show the versatility of the principles disclosed herein and are not intended to limit the invention. An "x" indicates successful lamination of the two substrates using DEMM as an adhesive.

TABLE 18

Laminate Examples

|  | ABS | PC | acrylic | PETG | HIPS | glass | steel | Kapton | Si Wafer |
|---|---|---|---|---|---|---|---|---|---|
| ABS | x | x | x | x | x | x | x | x | x |
| PC | x | x | x | x | x | x | x | x | x |
| acrylic | x | x | x | x | x | x | x | x | x |
| PETG | x | x | x | x | x | x | x | x | x |
| HIPS | x | x | x | x | x | x | x | x | x |
| glass | x | x | x | x | x | x | x | x |  |
| steel | x | x | x | x | x | x | x |  |  |
| Kapton |  |  |  |  |  |  |  | x | x |
| Si Wafer |  |  |  |  |  |  |  | x | x |

Suitable formulation additives may be used to tailor the physical properties of the laminate structures in order to meet desired specifications. The principles disclosed herein may be used with other di-activated vinyl compounds such as methylene malonates, methylene ☐-ketoesters, methylene β-di-ketones, dialkyl disubstituted vinyl, dihaloalkyl disubstituted vinyl, whether monofunctional, difunctional, or multifunctional.

In certain exemplary embodiments, polymerizable compositions disclosed herein may also be used as adhesives in composite or laminate structures. Examples include such diverse applications as shoe soles, body armor, and composites for windmill blades.

Additionally, composites and laminates formed according to the principles disclosed herein can be rigid or flexible depending on the desired application. For example, structural materials, building panels, aerospace body components are just some examples of rigid composites or laminates. Other embodiments include decorative films or packaging materials that may require flexible composites or laminates. Such rigid and flexible components are within the scope of the present invention.

Activating Agents, Primers or Initiators

Activating agents suitable for use in the practice of the present invention vary widely. Selection of the specific activating agent depends upon the chemistry of the polymerizable composition, the nature of cure mechanisms employed, the method and/or conditions by which the polymerization is to be effectuated, the end-use application and/or the nature of any substrate employed in the practice of the invention. The activating agents may include those involved with the polymerization of one or more polymerizable monomers, prepolymers, and/or low molecular weight polymers or oligomers, including for example, activators, co-activators, accelerators, co-accelerators, catalysts, co-catalysts, initiators and co-initiators. Of general interest for the disubstituted vinyl monomers such as methylene malonates are bases, base precursors, base converters, and base enhancers. For convenience, unless otherwise stated herein, the terms "polymerization activator," "activator," "activating agent," "primer," or "initiator" is used herein to mean any and all such agents.

Suitable activators for the systems disclosed herein include, but are not limited to, sodium or potassium acetate; acrylic, maleic or other acid salts of sodium, potassium, lithium, copper, cobalt, or other metal cations; salts such as tetrabutyl ammonium fluoride, chloride, bromide, iodide or hydroxide; or chemically basic materials such as amines and amides; or salts of polymer bound acids; benzoate salts; 2,4-pentanedionate salts; sorbate salts; or propionate salts.

Various activation methods may be used to activate the polymerizable compositions as discussed herein, including an already basic surface on the substrate. Other activation methods include the release of catalytic amounts of encapsulated bases, base precursors or base creators via energy exposure to facilitate polymerization. Other contemplated activation methods include the application of a base, base precursor, or base creator through a physical dispensation method (e.g., through a syringe, spray mechanism, and the like). Various activating methods applicable to the composite compositions disclosed herein are discussed in greater detail in a co-pending PCT International patent application, Serial No. PCT/US13/34636, filed Mar. 29, 2013, entitled "Methods for Activating Polymerizable Compositions, Polymerizable Systems, and Products Formed Thereby" and claiming priority to U.S. Provisional Application 61/618,147, filed Mar. 30, 2012 which is hereby incorporated by reference in its entirety.

EQUIVALENTS

Those skilled in the art will recognize, or be able to ascertain using no more than routine experimentation, many equivalents to the specific embodiments of the invention described herein. Such equivalents are intended to be encompassed by this invention.

What is claimed is:

1. A composite material comprising:
   a polymer material formed from one or more monomers, the one or more monomers selected from the group consisting of a methylene malonate monomer, a methylene betaketoester monomer, and a methylene betadiketone monomer; and
   a filler material, the filler material comprising one or more of glass, natural and synthetic fiber, carbon, clay, fiberglass, carbon fiber, wood particles, wood shavings, wood flour, alumina, sand, plastics, polycarbonate, acrylonitrile butadiene styrene, aluminized fiberglass, polyethylene fibers, polypropylene fibers, and aramid fiber; and
   wherein each of the methylene malonate monomer, the methylene betaketoester monomer, and the methylene betadiketone monomer are multifunctional monomers.

2. The composite material according to claim 1, wherein the methylene malonate monomer is represented by the formula: $R^1$—OC(O)—C(=CH$_2$)—C(O)—O—$R^2$; and
   wherein $R^1$ and $R^2$ are independently C1-C15 alkyl, C2-C15 alkenyl, halo-(C1-C15 alkyl), C3-C6 cycloalkyl, halo-(C3-C6 cycloalkyl), heterocyclyl, heterocyclyl-(C1-C15 alkyl), aryl, aryl-(C1-C15 alkyl), heteroaryl, heteroaryl-(C1-C15 alkyl), or alkoxy-(C1-C15 alkyl), each of which may be optionally substituted by C1-C15 alkyl, halo-(C1-C15 alkyl), C3-C6 cycloalkyl, halo-(C3-C6 cycloalkyl), heterocyclyl, heterocyclyl- (C1-C15 alkyl), -aryl, aryl-(C1-C15 alkyl), heteroaryl, C1-C15 alkoxy, C1-C15 alkylthio, hydroxyl, nitro, azido, acyloxy, carboxy, ester or sulfonyl; or
wherein R and $R^2$ are taken together with the atoms to which they are bound to form a 5-7 membered heterocyclic ring which may be optionally substituted by C1-C15 alkyl, halo-(C1-C15 alkyl), C3-C6 cycloalkyl, halo-(C3-C6 cycloalkyl), heterocyclyl, heterocyclyl-(C1-C15 alkyl), aryl, aryl-(C1-C15 alkyl), heteroaryl, C1-C15 alkoxy, C1-C15 alkylthio, hydroxyl, nitro, azido, acyloxy, carboxy, ester or sulfonyl.

3. The composite material according to claim 1, wherein the methylene betaketoester monomer is represented by the formula: $R^3$—C(O)—C(=$CH_2$)—C(O)—O—$R^4$; and
wherein $R^3$ and $R^4$ are independently C1-C15 alkyl, C2-C15 alkenyl, halo-(C1-C15 alkyl), C3-C6 cycloalkyl, halo-(C3-C6 cycloalkyl), heterocyclyl, heterocyclyl-(C1-C15 alkyl), aryl, aryl-(C1-C15 alkyl), heteroaryl, heteroaryl-(C1-C15 alkyl), or alkoxy-(C1-C15 alkyl), each of which may be optionally substituted by C1-C15 alkyl, halo-(C1-C15 alkyl), C3-C6 cycloalkyl, halo-(C3-C6 cycloalkyl), heterocyclyl, heterocyclyl-(C1-C15 alkyl), aryl, aryl-(C1-C15 alkyl), heteroaryl, C1-C15 alkoxy, C1-C15 alkylthio, hydroxyl, nitrol, azido, acyloxy, carboxy, ester or sulfonyl; or
wherein $R^3$ and $R^4$ are taken together with the atoms to which they are bound to form a 5-7 membered heterocyclic ring which may be optionally substituted by C1-C15 alkyl, halo-(C1-C15 alkyl), C3-C6 cycloalkyl, halo-(C3-C6 cycloalkyl), heterocyclyl, heterocyclyl-(C1-C15 alkyl), aryl, aryl-(C1-C15 alkyl), heteroaryl, C1-C15 alkoxy, C1-C15 alkylthio, hydroxyl, nitro, azido, acyloxy, carboxy, ester or sulfonyl.

4. The composite material according to claim 1, wherein the methylene betadiketone monomer is represented by the formula: $R^5$—C(O)—C(=$CH_2$)—C(O)—$R^6$; and
wherein $R^5$ and $R^6$ are independently C1-C15 alkyl, C2-C15 alkenyl, halo-(C1-C15 alkyl), C3-C6 cycloalkyl, halo-(C3-C6 cycloalkyl), heterocyclyl, heterocyclyl-(C1-C15 alkyl), aryl, aryl-(C1-C15 alkyl), heteroaryl, or heteroaryl-(C1-C15 alkyl), or alkoxy-(C1-C15 alkyl), each of which may be optionally substituted by C1-C15 alkyl, halo-(C1-C15 alkyl), C3-C6 cycloalkyl, halo-(C3-C6 cycloalkyl), heterocyclyl, heterocyclyl-(C1-C15 alkyl), aryl, aryl-(C1-C15 alkyl), heteroaryl, C1-C15 alkoxy, C1-C15 alkylthio, hydroxyl, nitro, azido, acyloxy, carboxy, ester or sulfonyl; or
wherein $R^5$ and $R^6$ are taken together with the atoms to which they are bound to form a 5-7 membered heterocyclic ring which may be optionally substituted by C1-C15 alkyl, halo-(C1-C15 alkyl), C3-C6 cycloalkyl, halo-(C3-C6 cycloalkyl), heterocyclyl, heterocyclyl-(C1-C15 alkyl), aryl, aryl-(C1-C15 alkyl), heteroaryl, C1-C15 alkoxy, C1-C15 alkylthio, hydroxyl, nitro, azido, acyloxy, carboxy, ester or sulfonyl.

5. The composite material according to claim 1, wherein the multifunctional monomer comprises two or more units represented by the structure: —W—C(O)—C(=$CH_2$)—C(O)—W—, where W represents —O— or a direct bond.

6. The composite material according to claim 1, wherein the polymer material is formed from two or more multifunctional monomers.

7. The composite material according to claim 1, wherein the polymer material is formed from one or more monofunctional monomers and one or more multifunctional monomers.

8. An article of manufacture comprising the composite material of claim 1.

9. The article of manufacture according to claim 8 comprising one or more thermally sensitive materials unable to withstand applied heat of greater than 100° C.

10. The composite material according to claim 1, further comprising a polymerization activator.

11. The composite material according to claim 10, wherein the polymerization activator is present in or on the filler material.

12. The composite material according to claim 10, wherein the polymerization activator is in the form of a base, a base precursor, a base creator, or a base enhancer.

13. The composite material according to claim 12, wherein the polymerization activator comprises one or more of an organic material, an inorganic material and an organometallic material.

14. The composite material according to claim 10, wherein the polymerization activator comprises one or more of: sodium acetate; potassium acetate; acid salts of sodium, potassium, lithium, copper, and cobalt; tetrabutyl ammonium fluoride, chloride, and hydroxide; an amine whether primary, secondary or tertiary; an amide; salts of polymer bound acids; benzoate salts; 2,4-pentanedionate salts; sorbate salts; propionate salts; secondary aliphatic amines; piperidene, piperazine, N-methylpiperazine, dibutylamine, morpholine, diethylamine, pyridine, triethylamine, tripropylamine, triethylenediamine, N,N-dimethylpiperazine, butylamine, pentylamine, hexylamine, heptylamine, nonylamine, decylamine; salts of amines with organic monocarboxylic acids; piperidine acetate; metal salt of a lower monocarboxylic acid; copper(II) acetate, cupric acetate monohydrate, potassium acetate, zinc acetate, zinc chloracetate, magnesium chloracetate, magnesium acetate; and salts of polyacrylic acid copolymers.

15. The composite material according to claim 1, further comprising a formulation additive.

16. The composite material according to claim 15, wherein the formulation additive comprises one or more of plasticizers, thixotropic agents, adhesion promoters, antioxidants, light stabilizers, UV stabilizers, fillers, surfactants, wetting agents, viscosity modifiers, extenders, dispersants, anti-blocking agents, defoamers, air release agents, anti-sagging agents, anti-setting agents, matting agents, flattening agents, waxes, anti-mar additives, anti-scratch additives, and inert resins.

17. A method for preparing a laminate material, the method comprising:
providing a first substrate;
applying to the first substrate a laminate adhesive comprising a polymer material formed from one or more monomers, the one or more monomers selected from the group consisting of a methylene malonate monomer, a methylene betaketoester monomer, and a methylene betadiketone monomer; and
adhering a second substrate to the first substrate by curing of the laminate adhesive; and
wherein each of the methylene malonate monomer, the methylene betaketoester monomer, and the methylene betadiketone monomer are multifunctional monomers.

18. The method for preparing a laminate material according to claim 17, further comprising the applying a polymerization activator to the first or second substrate.

19. The method for preparing a laminate material according to claim 17, wherein the first and second substrate may be of the same material or of different materials and are independently selected from the group consisting of: plant-based material, plastic, carbon-based material, metal, and glass-based material.

20. The method for preparing a laminate material according to claim 17, wherein the first and second substrate may be of the same material or of different materials and are independently selected from the group consisting of: paper, oak, Douglass fir, balsa, polyphenyl ether (PPE) plastic, polycarbonate (PC), silicon, glass, fiberglass, silver coated copper, copper, steel, polypropylene, biaxially oriented polypropylene, monoaxially oriented polypropylene, polyethylene, polyester, polyethylene terephthalate, biaxially oriented polyethylene terephthalate, and aluminum.

21. The method for preparing laminate material according to claim 17, further comprising providing a polymerization activator in the form of a base, a base precursor, a base creator or a base enhancer within the polymer material or on one of the substrates.

22. The method for preparing laminate material according to claim 21, wherein the polymerization activator comprises one or more of an organic material, an inorganic material, and an organometallic material.

23. The method for preparing laminate material according to claim 22, wherein the polymerization activator comprises one or more of: sodium acetate; potassium acetate; acid salts of sodium, potassium, lithium, copper, and cobalt; tetrabutyl ammonium fluoride, chloride, and hydroxide; an amine whether primary, secondary or tertiary; an amide; salts of polymer bound acids; benzoate salts; 2,4-pentanedionate salts; sorbate salts; propionate salts; secondary aliphatic amines; piperidene, piperazine, N-methylpiperazine, dibutylamine, morpholine, diethylamine, pyridine, triethylamine, tripropylamine, triethylenediamine, N,N-dimethylpiperazine, butylamine, pentylamine, hexylamine, heptylamine, nonylamine, decylamine; salts of amines with organic monocarboxylic acids; piperidine acetate; metal salt of a lower monocarboxylic acid; copper(II) acetate, cupric acetate monohydrate, potassium acetate, zinc acetate, zinc chloracetate, magnesium chloracetate, magnesium acetate; and salts of polyacrylic acid copolymers.

24. The method for preparing the laminate material according to claim 17, further comprising providing a formulation additive.

25. The method for preparing laminate material according to claim 24, wherein the formulation additive comprises one or more of: plasticizers, thixotropic agents, adhesion promoters, antioxidants, light stabilizers, UV stabilizers, fillers, surfactants, wetting agents, viscosity modifiers, extenders, dispersants, anti-blocking agents, defoamers, air release agents, anti-sagging agents, anti-setting agents, matting agents, flattening agents, waxes, anti-mar additives, anti-scratch additives, and inert resins.

26. A laminate article of manufacture prepared by method of claim 17.

27. The laminate article of manufacture according to claim 26 is a flexible laminate article.

28. The laminate article of manufacture according to claim 27, wherein the flexible laminate article is a film or a packaging material.

29. The laminate article of manufacture according to claim 26, further comprising at least one thermally sensitive material.

30. A method for preparing a composite article comprising
providing a polymer material, the polymer material formed from one or more of a methylene malonate monomer, a methylene betaketoester monomer, and a methylene betadiketone monomer;
providing a reinforcing or filler material;
incorporating a polymerization activator with one or more of the polymer material or the reinforcing or filler material; and
molding the polymer material and the reinforcing or filler material; and
wherein each of the methylene malonate monomer, the methylene betaketoester monomer, and the methylene betadiketone monomer are multifunctional monomers.

31. The method according to claim 30, wherein the polymerization activator is in the form of a base, a base precursor, a base creator or a base enhancer.

32. The method according to claim 31, wherein the polymerization activator comprises one or more of an organic material, an inorganic material, and an organometallic material.

33. The method according to claim 30, wherein the polymerization activator comprises one or more of sodium acetate; potassium acetate; acid salts of sodium, potassium, lithium, copper, and cobalt; tetrabutyl ammonium fluoride, chloride, and hydroxide; an amine whether primary, secondary or tertiary; an amide; salts of polymer bound acids; benzoate salts; 2,4-pentanedionate salts; sorbate salts; propionate salts; secondary aliphatic amines; piperidene, piperazine, N-methylpiperazine, dibutylamine, morpholine, diethylamine, pyridine, triethylamine, tripropylamine, triethylenediamine, N,N-dimethylpiperazine, butylamine, pentylamine, hexylamine, heptylamine, nonylamine, decylamine; salts of amines with organic monocarboxylic acids; piperidine acetate; metal salt of a lower monocarboxylic acid; copper(II) acetate, cupric acetate monohydrate, potassium acetate, zinc acetate, zinc chloracetate, magnesium chloracetate, magnesium acetate; and salts of polyacrylic acid copolymers.

34. The method according to claim 30, further comprising adding a formulation additive.

35. The method according to claim 34, wherein the formulation additive comprises one or more of: plasticizers, thixotropic agents, adhesion promoters, antioxidants, light stabilizers, UV stabilizers, fillers, surfactants, wetting agents, viscosity modifiers, extenders, dispersants, anti-blocking agents, defoamers, air release agents, anti-sagging agents, anti-setting agents, matting agents, flattening agents, waxes, anti-mar additives, anti-scratch additives, and inert resins.

36. The article of manufacture according to claim 8 is a flexible composite article.

37. The article of manufacture according to claim 36, wherein the flexible composite article is a film, a packaging component, or a construction material.

38. The article of manufacture according to claim 8 is a rigid composite article.

39. The article of manufacture according to claim 38, wherein the rigid composite article is a structural article, a furniture article, an aerospace component, a building article, or a construction article.

40. A composite material comprising:
a polymer material, the polymer material formed from one or more di-activated vinyl monomers, each of the one or more di-activated vinyl monomers being multifunctional di-activated vinyl monomers; and
a reinforcing or filler material;
wherein the one or more di-activated vinyl monomers polymerize at temperatures of 100° C. or less and are not cyanoacrylate monomers.

41. The composite material according to claim 40, wherein the di-activated vinyl monomer is a methylene malonate monomer represented by the formula: $R^1$—O—C(O)—C(=CH$_2$)—C(O)—O—$R^2$; and wherein $R^1$ and $R^2$ are independently C1-C15 alkyl, C2-C15 alkenyl, halo-(C1-C15 alkyl), C3-C6 cycloalkyl, heterocyclyl, heterocyclyl-(C1-C15 alkyl), aryl-(C1-C15 alkyl), or alkoxy-(C1-C15 alkyl), each of which may be optionally substituted by C1-C15 alkyl, halo-(C1-C15 alkyl), aryl, aryl-(C1-C15 alkyl), C1-C15 alkoxy, C1-C15 alkylthio, or hydroxyl; or wherein $R^1$ and $R^2$ are taken together with the atoms to which they are bound to form a 5-7 membered heterocyclic ring which may be optionally substituted by C1-C15 alkyl, halo-(C1-C15 alkyl), C3-C6 cycloalkyl, heterocyclyl, aryl, aryl-(C1-C15 alkyl), C1-C15 alkoxy, C1-C15 alkylthio, or hydroxyl.

42. The composite material according to claim 40, wherein the di-activated vinyl monomer is a methylene betaketoester monomer represented by the formula: $R^3$—C(O)—C(=CH$_2$)—C(O)—O—$R^4$; and wherein $R^3$ and $R^4$ are independently C1-C15 alkyl, C2-C15 alkenyl, halo-(C1-C15 alkyl), C3-C6 cycloalkylheterocyclyl, heterocyclyl-(C1-C15 alkyl), aryl, aryl-(C1-C15 alkyl), or alkoxy-(C1-C15 alkyl), each of which may be optionally substituted by C1-C15 alkyl, halo-(C1-C15 alkyl), aryl, aryl-(C1-C15 alkyl), C1-C15 alkoxy, C1-C15 alkylthio, or hydroxyl; or wherein $R^3$ and $R^4$ are taken together with the atoms to which they are bound to form a 5-7 membered heterocyclic ring which may be optionally substituted by C1-C15 alkyl, halo-(C1-C15 alkyl), C3-C6 cycloalkyl, heterocyclyl, aryl, aryl-(C1-C15 alkyl), C1-C15 alkoxy, C1-C15 alkylthio, or hydroxyl.

43. The composite material according to claim 40, wherein the di-activated vinyl monomer is a methylene betadiketone monomer represented by the formula: $R^5$—C(O)—C(=CH$_2$)—C(O)—$R^6$; and wherein $R^5$ and $R^6$ are independently C1-C15 alkyl, C2-C15 alkenyl, halo-(C1-C15 alkyl), C3-C6 cycloalkyl, heterocyclyl, heterocyclyl-(C1-C15 alkyl), aryl, aryl-(C1-C15 alkyl), or alkoxy-(C1-C15 alkyl), each of which may be optionally substituted by C1-C15 alkyl, halo-(C1-C15 alkyl), aryl, aryl-(C1-C15 alkyl), C1-C15 alkoxy, C1-C15 alkylthio, or hydroxyl; or wherein $R^5$ and $R^6$ are taken together with the atoms to which they are bound to form a 5-7 membered heterocyclic ring which may be optionally substituted by C1-C15 alkyl, halo-(C1-C15 alkyl), C3-C6 cycloalkyl, heterocyclyl, aryl, aryl-(C1-C15 alkyl), C1-C15 alkoxy, C1-C15 alkylthio, or hydroxyl.

44. The composite material according to claim 1, wherein the methylene malonate monomer is dimethyl malonate monomer, diethyl malonate monomer, ethylmethyl malonate monomer, dipropyl malonate monomer, dibutyl malonate monomer, diphenyl malonate monomer, and ethyl-ethylgluconate malonate monomer.

45. The composite material according to claim 1, wherein the methylene malonate monomer is diethyl methylene malonate monomer.

46. The composite material according to claim 1, wherein the polymer material polymerizes at ambient conditions.

47. A laminate comprising:
a first substrate;
a second substrate; and
the polymer material of claim 40 disposed between the first substrate and the second substrate;
wherein the first substrate and the second substrate may be of the same material or of different materials and are independently selected from the group consisting of: paper, oak, Douglass fir, balsa, polyphenylene ether (PPE) plastic, polycarbonate (PC), silicon, glass, fiberglass, silver coated copper, copper, steel, polypropylene, biaxially oriented polypropylene, monoaxially oriented polypropylene, polyethylene, polyester, polyethylene terephthalate, biaxially oriented polyethylene terephthalate, and aluminum.

48. A laminate according to claim 47, wherein the polymer material includes a formulation additive.

49. A laminate according to claim 48, wherein the formulation additive comprises one or more of: plasticizers, thixotropic agents, adhesion promoters, antioxidants, light stabilizers, UV stabilizers, fillers, surfactants, wetting agents, viscosity modifiers, extenders, dispersants, anti-blocking agents, defoamers, air release agents, anti-sagging agents, anti-setting agents, matting agents, flattening agents, waxes, anti-mar additives, anti-scratch additives, and inert resins.

* * * * *